(12) United States Patent
Sugawara et al.

(10) Patent No.: US 7,118,060 B2
(45) Date of Patent: Oct. 10, 2006

(54) ROTOR FOR SPINNING REEL

(75) Inventors: Ken'ichi Sugawara, Sakai (JP);
Takeshi Ikuta, Sakai (JP); Hirokazu Hiraoka, Sakai (JP); Hirokazu Hashimoto, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/931,969

(22) Filed: Sep. 2, 2004

(65) Prior Publication Data
US 2005/0082405 A1 Apr. 21, 2005

(30) Foreign Application Priority Data
Sep. 11, 2003 (JP) .............................. 2003-319321
Dec. 22, 2003 (JP) .............................. 2003-425018
Dec. 22, 2003 (JP) .............................. 2003-425019

(51) Int. Cl.
*A01K 89/01* (2006.01)

(52) U.S. Cl. .................. 242/311; 242/319; 242/231

(58) Field of Classification Search ................ 242/231, 242/232, 233, 311, 319, 907
See application file for complete search history.

(56) References Cited

U.S. PATENT DOCUMENTS

| | | | | |
|---|---|---|---|---|
| 4,416,427 A | * | 11/1983 | Kawai | .................. 242/244 |
| 5,934,589 A | * | 8/1999 | Young | .................. 242/321 |
| 5,947,397 A | | 9/1999 | Hitomi | |
| 6,382,540 B1 | * | 5/2002 | Takikura et al. | ............ 242/231 |
| 6,786,442 B1 | * | 9/2004 | Sugawara | .................. 242/231 |
| 2001/0011689 A1 | * | 8/2001 | Furomoto | .................. 242/231 |
| 2002/0056776 A1 | * | 5/2002 | Sugawara | .................. 242/231 |
| 2002/0175236 A1 | * | 11/2002 | Hitomi | .................. 242/230 |
| 2003/0173437 A1 | * | 9/2003 | Iwabuchi et al. | ........... 242/231 |

FOREIGN PATENT DOCUMENTS

| | | |
|---|---|---|
| EP | 0 750 841 A1 | 1/1997 |
| EP | 1 068 800 A2 | 1/2001 |
| JP | 2001-190179 A | 7/2001 |

* cited by examiner

*Primary Examiner*—Kathy Matecki
*Assistant Examiner*—Evan H. Langdon
(74) *Attorney, Agent, or Firm*—Global IP Counselors, LLP

(57) ABSTRACT

A rotor includes a cylindrical portion, a front wall, and first and second rotor arms. The front wall is formed on an inner periphery of the cylindrical portion near its front end. The first and second rotor arms are arranged opposite one another on the sides of the cylindrical portion. The front wall includes a link portion and a disk portion. The outer periphery of the cylindrical portion where the link portion is linked is overlaid by the spool when the spool is at a foremost position. The disk portion is integrally linked to the link portion. The link portion includes an annular portion and a tapered portion. The annular portion is linked to the inner periphery of the cylindrical portion at its front end. The tapered portion is linked to the inner periphery of the annular portion and is tapered so that its diameter rearwardly decreases.

14 Claims, 19 Drawing Sheets

ROTOR FOR SPINNING REEL

BACKGROUND OF THE INVENTION

1. Field of the Invention

The present invention relates to a rotor. More specifically, the present invention relates to a rotor for a spinning reel which guides and winds fishing line around an axially oscillating spool.

2. Background Information

Spinning reels generally have a reel unit that is mounted to a fishing rod, a rotor rotatably mounted to the reel unit that guides fishing line, and a cylindrical spool, which can be oscillated and onto which fishing line that has been guided by the rotor is wound. The rotor includes a cylindrical portion that is rotatably mounted to the reel unit, a disk portion that is provided inside the cylindrical portion and is mounted to the pinion gear, and a pair of rotor arms that extends radially outwardly from the rear end of the cylindrical portion as shown in, for example, Japanese unexamined patent application publication 2001-190191.

This type of rotor is unitarily formed by a metal or synthetic member. With this type of rotor, the cylindrical portion, the disk portion, and the pair of arms are unitarily formed by die-casting or injection molding, for example.

With the above described conventional rotor of a spinning reel, since the cylindrical portion and the disk portion are unitarily formed by die-casting or injection molding, a joint section between the cylindrical portion and the disk portion is made thick. When the joint section between the cylindrical portion and the disk portion is made to be thick, an annular sink mark may appear around the outer periphery of the cylindrical portion. In the case where the sink mark appears around the outer periphery of the cylindrical portion, when the sink mark is exposed to the exterior of the reel, the exposed sink may lead to a less attractive appearance.

In view of the above, it will be apparent to those skilled in the art from this disclosure that there exists a need for an improved rotor for a spinning reel. This invention addresses this need in the art as well as other needs, which will become apparent to those skilled in the art from this disclosure.

SUMMARY OF THE INVENTION

In view of the aforementioned problems, it is an object to provide a rotor of spinning reel with a pleasing external appearance.

In a rotor of a spinning reel according to a first aspect of the present invention, the rotor is adapted to be rotatably mounted to a reel unit. The rotor is mounted to a pinion gear for guiding and winding fishing line around a spool that is to be oscillated frontward and rearward in its axial direction relative to the reel unit. The rotor includes a cylindrical portion, a front wall, and a pair of first and second rotor arms. The cylindrical portion is adapted to be rotatably mounted to the reel unit. The front wall includes a link portion that is linked to an inner periphery of the cylindrical portion near a front end of the cylindrical portion, and a disk portion that is integrally linked to the link portion at an axial rear side of the link portion and is adapted to be immovably mounted to the pinion gear. The first and second rotor arms extend frontward from locations opposite each other on the outer periphery of the cylindrical portion at the rear end of the cylindrical portion such that a space is maintained between each of the first and second rotor arms and the cylindrical portion. The cylindrical portion, the front wall, and the pair of first and second rotor arms are formed by molding.

The molding herein includes die-casting. With this rotor, the wall portion includes the link portion that is linked to an inner periphery of the cylindrical portion near the front end of the cylindrical portion, and the disk portion that is integrally linked to the link portion. In this case, since a location of the outer periphery of the cylindrical portion, to which the link portion is linked, is provided in proximity to the front end of the cylindrical portion, even if a sink mark were to appear on the outer periphery of the cylindrical portion where the link portion is linked, the sink mark is covered or hardly exposed on the exterior of the reel. Therefore, a pleasing external appearance can be provided.

Preferably, an outer portion of the cylindrical portion where the link portion is linked to the inner periphery of the cylindrical portion is adapted to be overlaid by the spool when the spool travels at its foremost position. In this case, since the location of the inner periphery of the cylindrical portion to which the link portion is linked is overlaid by the spool when the spool travels at the foremost position, a sink mark, which appears in the outer periphery, can be hidden. Therefore, a pleasing external appearance can be provided.

A rotor according to a second aspect of the present invention is the rotor according to the first aspect of the invention, wherein the link portion includes a tapered portion that is tapered so that its diameter rearwardly decreases. In this case, forming the tapered portion in the link portion decreases the thickness of the joint section between the cylindrical portion and the tapered portion. Thus, a sink mark is not prone to appear in this section. Furthermore, since the tapered portion is formed to be inwardly inclined, water that enters the interior can be easily drained.

A rotor according to a third aspect of the present invention is the rotor according to the first aspect or the second aspect of the invention, wherein the link portion includes an annular portion that is linked to the inner periphery of the cylindrical portion at the front end of the link portion, and a tapered portion that is linked to the inner periphery of the annular portion and is tapered so that its diameter rearwardly decreases. In this case, since the thickness of the annular portion is smaller than a conventional disk portion, a sink mark is less likely to appear. Furthermore, by forming the annular portion and the tapered portion in the link portion, the cylindrical portion and the annular portion can be easily jointed. In addition, water that enters the interior can be easily drained by the tapered portion through centrifugal force that is generated by rotation of the rotor.

A rotor according to a fourth aspect of the present invention is the rotor according to the first aspect or the second aspect of the invention, wherein the link portion includes an annular portion that is linked to the inner periphery of the cylindrical portion at the front end of the link portion, and a cylindrical portion that is linked to the inner periphery of the annular portion and extends rearwardly so that its diameter is the same as the diameter of the disk portion. In this case, since the link portion includes the annular portion and the tubular portion, the thickness of the annular portion is smaller than that of a conventional disk portion. Thus, a sink mark is less likely to appear. Furthermore, forming the annular portion and the tubular portion without a tapered portion can allow the use of a simple die. Accordingly, the link portion can be easily formed.

A rotor according to a fifth aspect of the present invention is the rotor according to any of the first to fourth aspects of the invention, wherein the cylindrical portion, the front wall, and the first and second rotor arms are unitarily formed as a one-piece member. In this case, since all of the cylindrical portion, the front wall, and the first and second rotor arms, which compose the rotor, are unitarily formed, thus, the total number of parts can be reduced.

A rotor according to a sixth aspect of the present invention is the rotor according to any of the first through fifth aspects of the invention, the cylindrical portion, the front wall, and the first and second rotor arms are formed of a metal by die-casting. In this case, the cylindrical portion, the front wall, and the first and second rotor arms can be unitarily formed having a high degree of strength by die-casting a metal.

A rotor according to a seventh aspect of the present invention is the rotor according to any of the first through fifth aspects of the invention, wherein the cylindrical portion, the front wall, and the first and second rotor arms are formed of a synthetic resin by injection molding. In this case, the front wall, and the first and second rotor arms can be easily formed by injection-molding a synthetic resin.

A rotor according to an eighth aspect of the present invention is the rotor according to the second aspect of the invention, wherein the tapered portion is linked to the inner periphery of the cylindrical portion.

With a rotor of a spinning reel according to the present invention, a front wall includes a link portion that is linked to an inner periphery of a cylindrical portion adjacent to the front end of the cylindrical portion, and a disk portion that is integrally linked to the link portion, thus, a pleasing external appearance can be provided.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
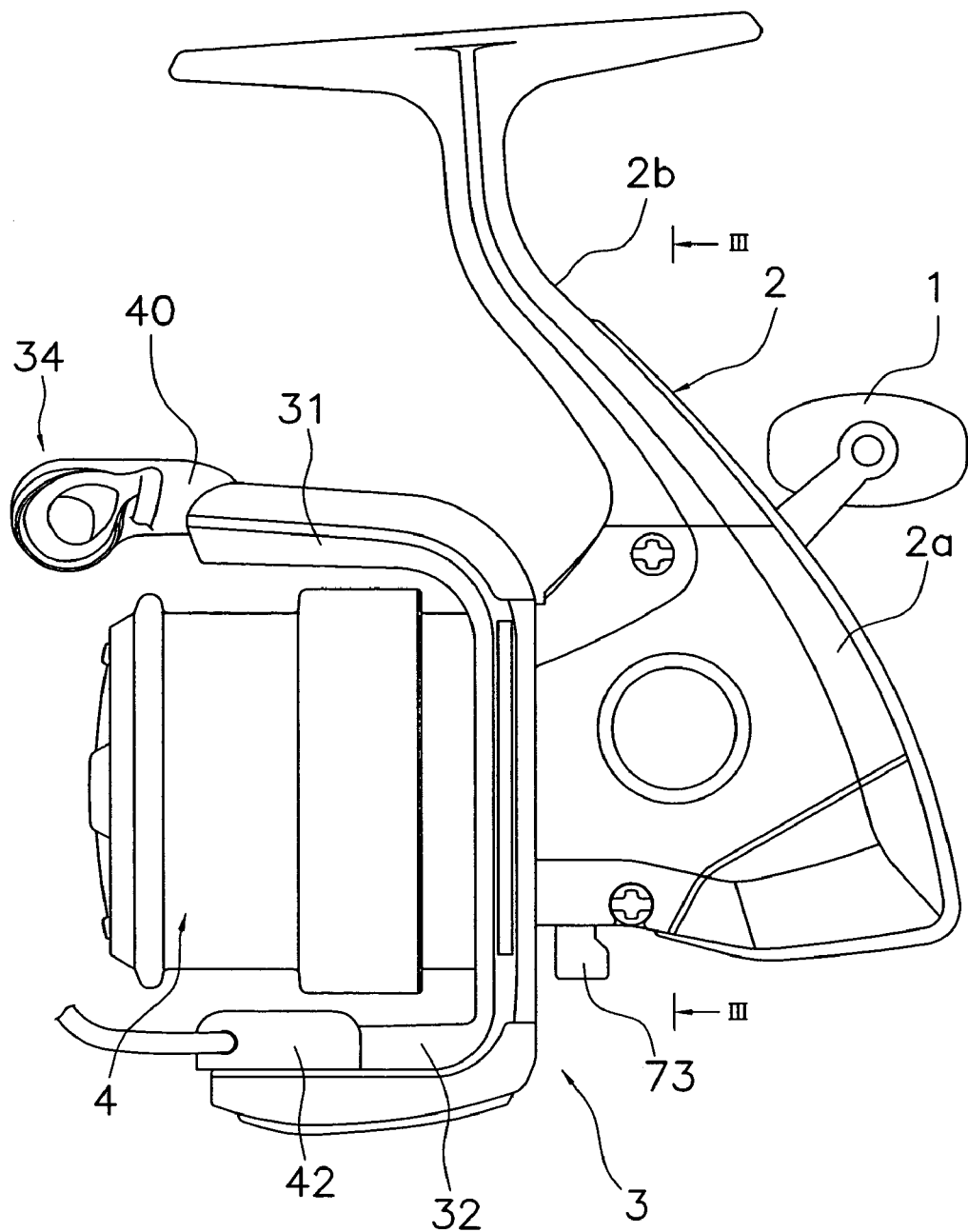
FIG. 1 is a side view of a spinning reel in accordance with a first preferred embodiment of the present invention.
Figure 2:
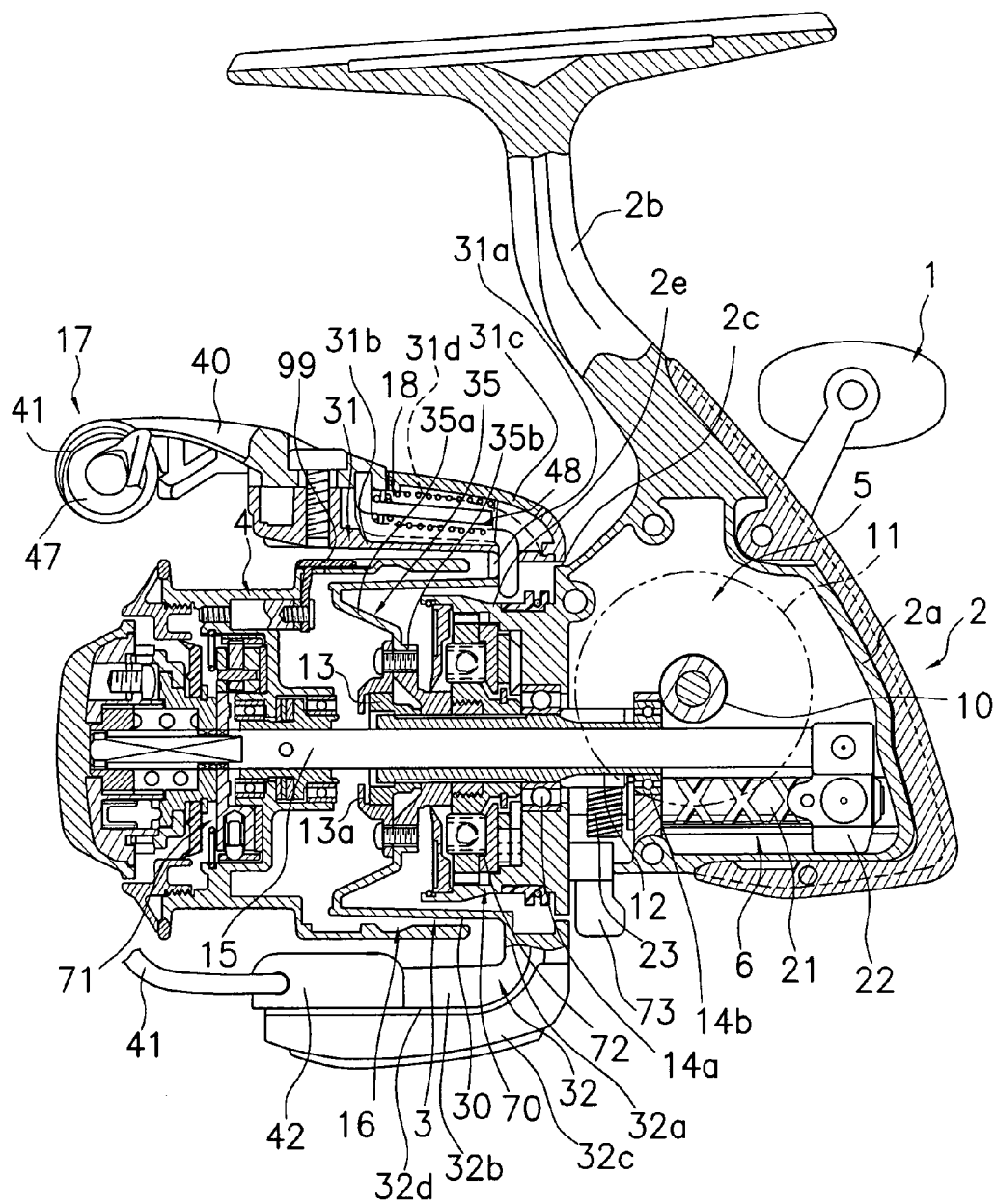
FIG. 2 is a lateral cross-sectional view of the spinning reel.

As shown in FIGS. 1 and 2, a spinning reel in accordance with a preferred embodiment of the present invention primarily includes a handle assembly 1, a reel unit 2 that rotatably supports the handle assembly 1, a rotor 3, and a spool 4. The rotor 3 is rotatably supported at the front of the reel unit 2, and is interposed by the reel unit 2 and the spool 4. The spool 4 has fishing line wound around the outer peripheral surface thereof, and is disposed on the front of the rotor 3 so that it can be moved forward and backward relative to the reel unit 2.

Figure 3:
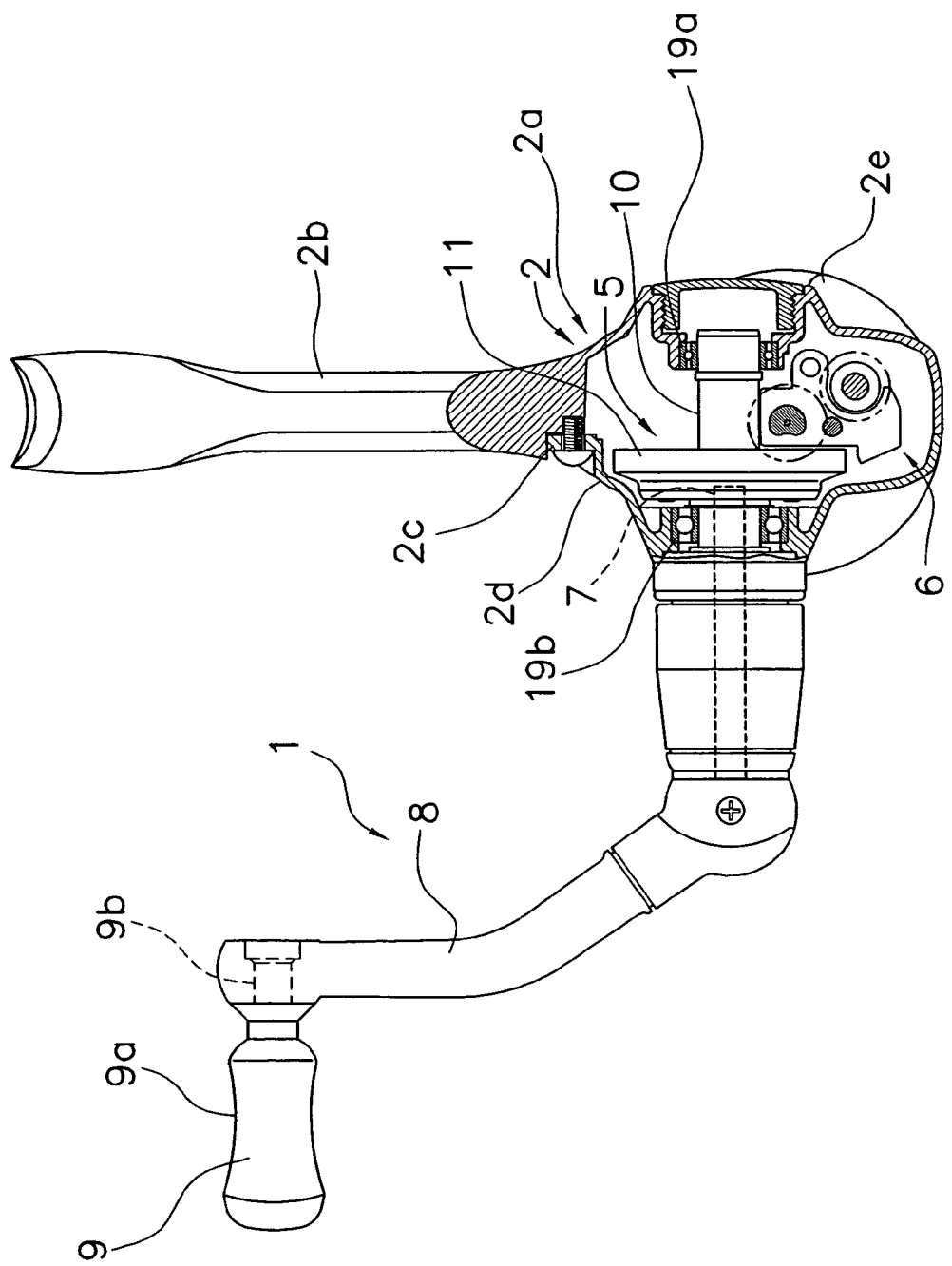
FIG. 3 is a cross-sectional view taken along a line III—III in FIG. 1.

As shown in FIG. 3, the handle assembly 1 includes a handle shaft 7 screwed into a master gear shaft 10 (described later), a handle arm 8 pivotably mounted to an end of the handle shaft 7 opposite the master gear shaft 10, and a handle grip 9 mounted to an end of the handle arm 8 opposite the handle shaft 7. The handle grip 9 includes a shaft portion 9b rotatably attached to an attachment portion 8a (see FIG. 4) of the handle arm 8, and a grip portion 9a, which is fastened to an end of the shaft portion 9b, to be gripped by a user.

Figure 4:
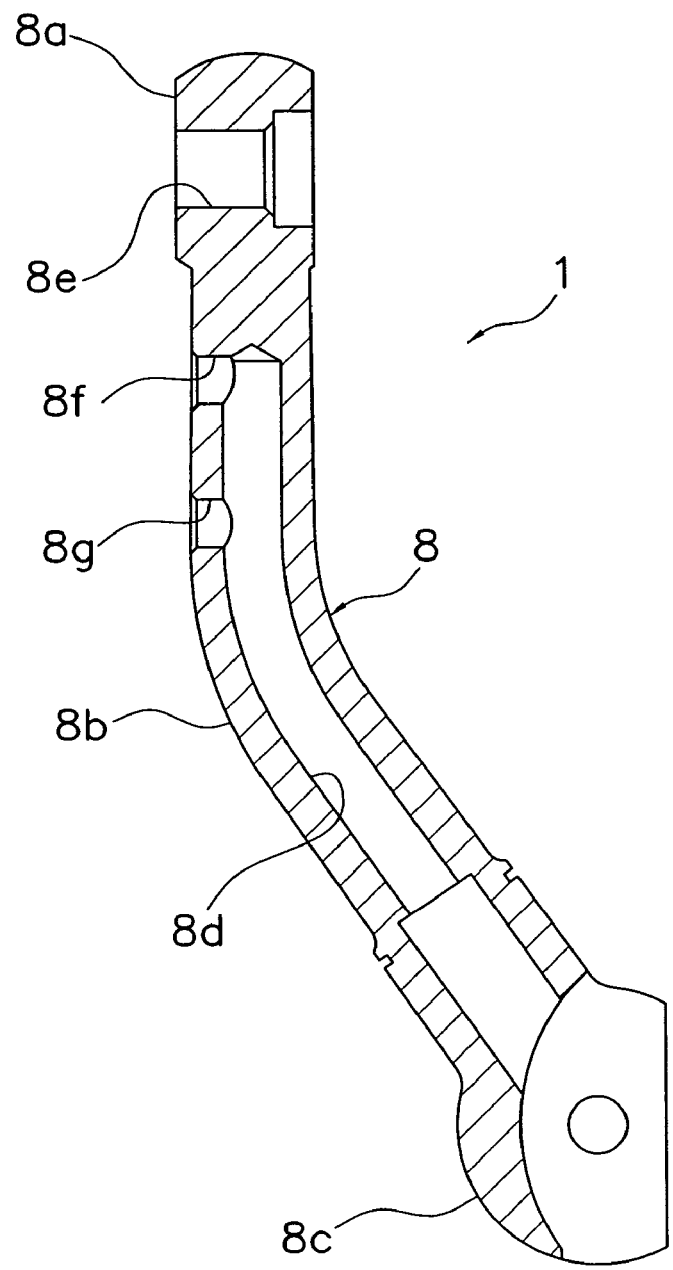
FIG. 4 is a cross-sectional view of a handle shaft of the spinning reel.

The handle arm 8 shown in an enlarged view of FIG. 4 is preferably made of an aluminum alloy. The handle arm 8 includes the attachment portion 8a, a spherical-shaped portion 8c, an arm body 8b, a hollowed portion 8d, and two through holes 8f and 8g. Referring to FIGS. 3 and 4, the attachment portion 8a includes an attachment hole 8e, to which the shaft portion 9b of the handle grip 9 is rotatably mounted. The spherical-shaped portion 8c has a generally spherical shape and is mounted to an end of the handle shaft 7. The arm body 8b extends in a direction that intersects the handle shaft 7 from the spherical-shaped portion 8c to the attachment hole 8e as one unitary member. The hollowed portion 8d is formed by cutting the arm body 8b inward from an end thereof, and opens at an end of the spherical-shaped portion 8c side of the arm body 8b. The through holes 8f and 8g penetrate from the exterior of the arm body 8b to the hollowed portion 8d. The through holes 8f and 8g are aligned on the opposite side from the reel unit 2 relative to the hollowed portion 8d of the arm body 8b. In addition, the entire surfaces of the attachment portion 8a, the spherical-shaped portion 8c, the hollowed portion 8d, the attachment hole 8e, and the through holed 8f and 8g are anodized.

Figure 5:
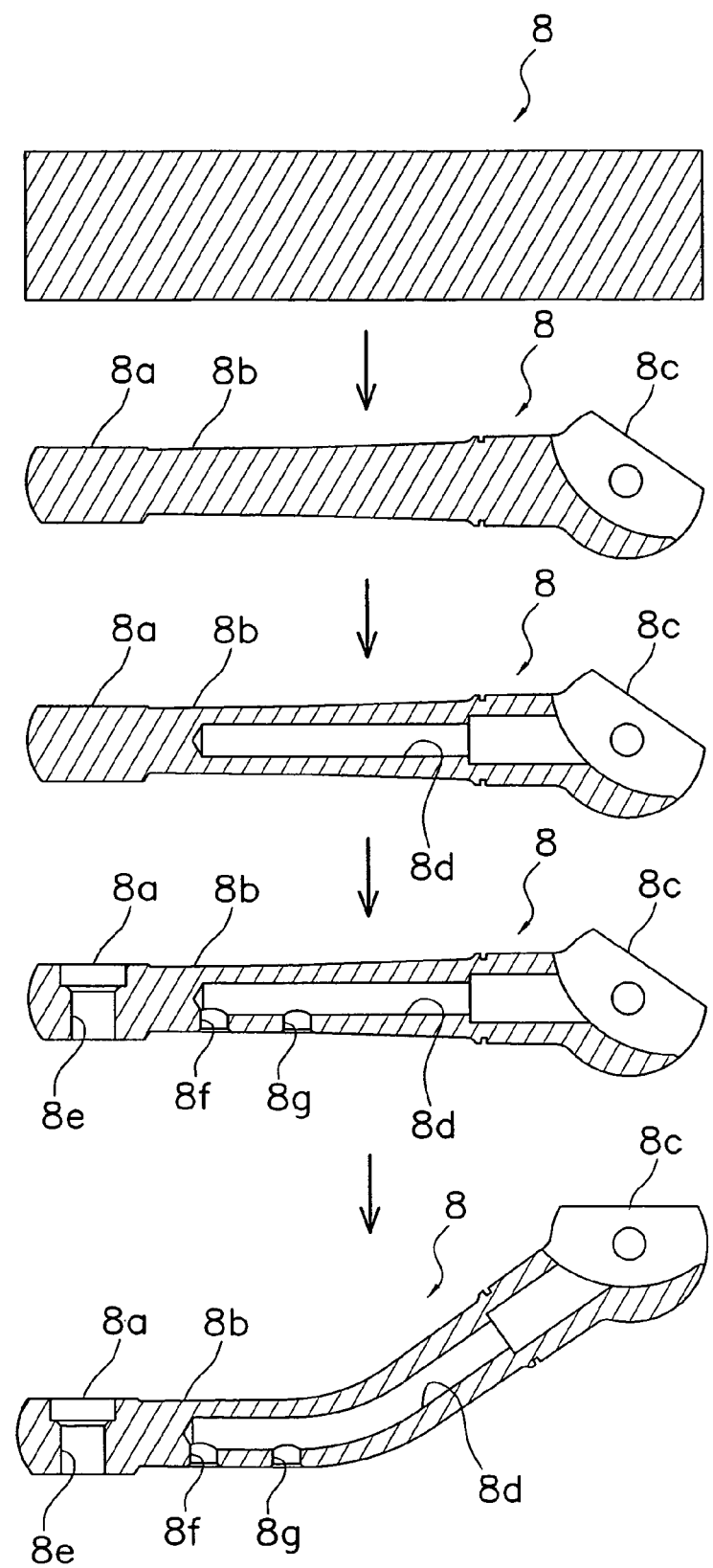
FIG. 5 is a view illustrating a manufacturing process of the handle arm.

Now, steps in a method for manufacturing the handle arm 8 will be described with reference to FIG. 5.

First, a rod-shaped solid member of an aluminum alloy is provided, and the outside shape of the attachment portion 8a, the arm body 8b and the spherical-shaped portion 8c is formed by a cutting process. Next, the hollowed portion 8d is formed by performing a cutting process from the end of the spherical portion 8c toward the arm body 8b. Subsequently, the attachment hole 8e penetrating the attachment portion 8a, and the through holes 8f and 8g penetrating from the exterior of the arm body 8b to the hollowed portion 8d are formed by a cutting process. After that, by anodizing the entire handle arm 8, an anodized aluminum surface is formed on the attachment portion 8a, the spherical-shaped portion 8c, the hollowed portion 8d, the attachment hole 8e, and the through holes 8f and 8g.

Finally, the arm body 8b is formed in a curved shape by a bending process. At that time, the arm body 8b is curved so that the end opening of the hollowed portion 8d in the spherical-shaped portion faces toward the side thereof.

With this handle assembly 1, since the through holes 8f and 8g are provided on the handle arm 8, a user can view the hollowed portion 8d inside the handle arm 8 from outside the handle arm 8. Accordingly, such appearance can positively lead the user to realize an advantage of the handle arm 8 in that the weight of the handle arm 8 is reduced.

Furthermore, in the case of anodic treatment for the handle arm 8, not only the exterior but also the interior of the handle arm 8 can be subjected to anodic treatment. Thus, it is possible to easily realize anticorrosive properties in the handle arm 8. This is because the through holes 8f and 8g are formed so as to communicate with the hollowed portion 8d. Moreover, even if sea water or the like seeps into the interior of the handle arm 8, draining the water can be easily achieved through the through holes 8f and 8g that communicate with the hollowed portion 8d.

As shown in FIGS. 1, 2 and 3, the reel unit 2 includes a reel body 2a having an opening on a side, a T-shaped rod attachment leg 2b extending diagonally upward to the front and formed integrally with the reel body 2a, and a lid member 2d which is mounted detachably to the reel body 2a and serves to enclose the opening (see FIG. 3).

As shown in FIG. 2, the reel body 2a is made, for example, of an aluminum alloy. The reel body 2a has a mechanism accommodating space in the interior thereof, which accommodates a rotor drive mechanism 5 and an oscillating mechanism 6. The rotor drive mechanism 5 transmits the rotation of the handle assembly 1 to rotate the rotor 3. The oscillating mechanism 6 serves to wind up uniformly the fishing line by shifting the spool 4 back and forth relative to the reel unit 2.

Figure 9:
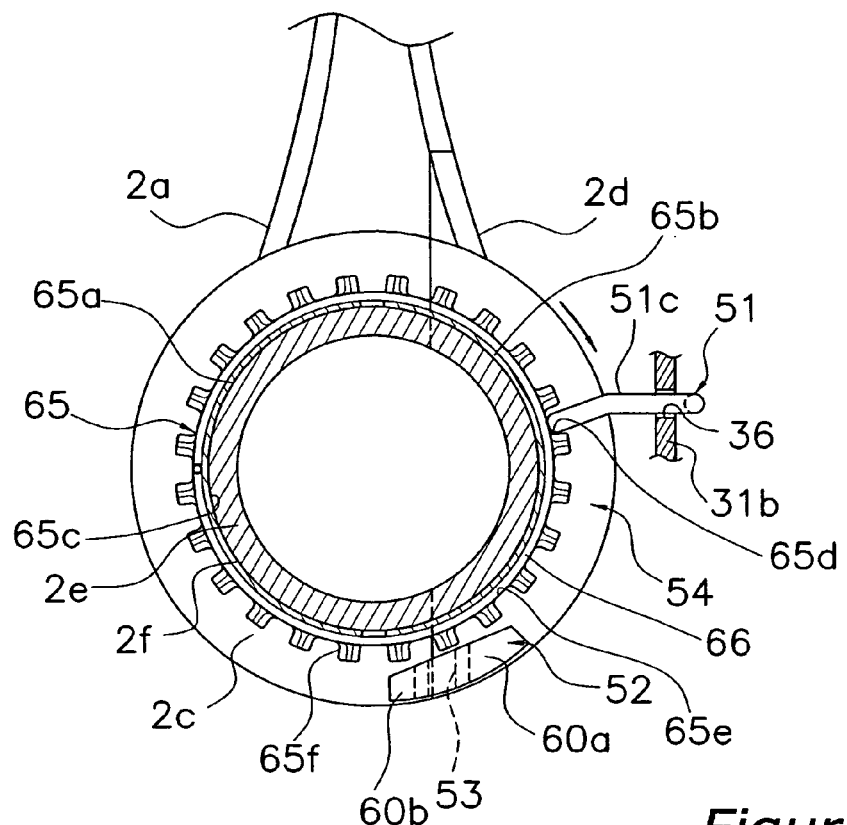
FIG. 9 is a front view of a reel body of the spinning reel that shows a bail tripping mechanism.

A circular flange portion 2c and a cylindrical portion 2e are formed on the front end of the reel body 2a and the lid member 2d. The cylindrical portion 2e is open to the front and its diameter is smaller than that of the flange portion 2c. As shown in FIG. 9, a mounting groove 2f that is circular in cross-section is formed in the cylindrical portion 2e.

Figure 10:
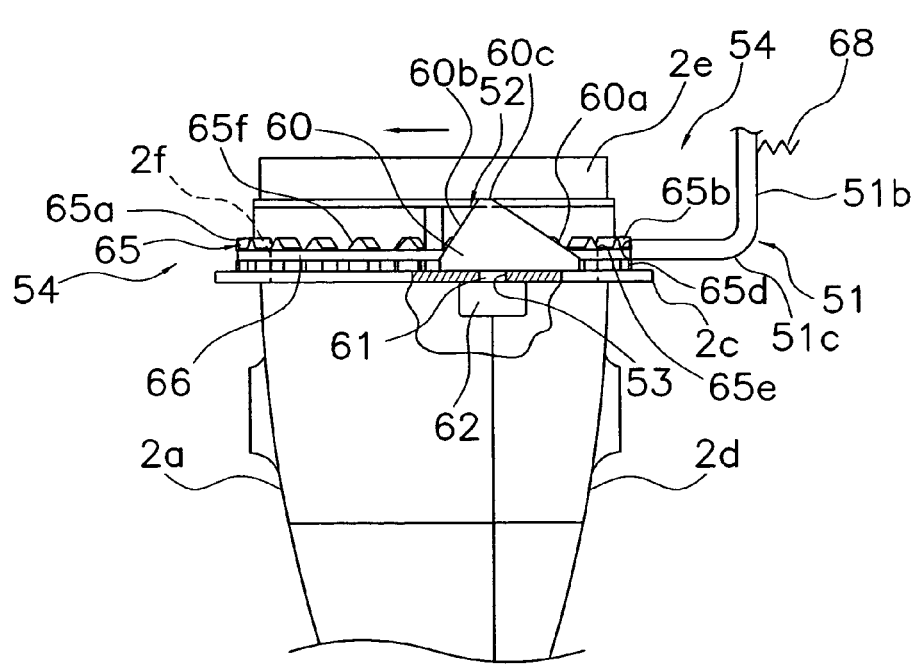
FIG. 10 is a partial bottom plan view of the reel body showing the bail tripping mechanism.
Figure 11:
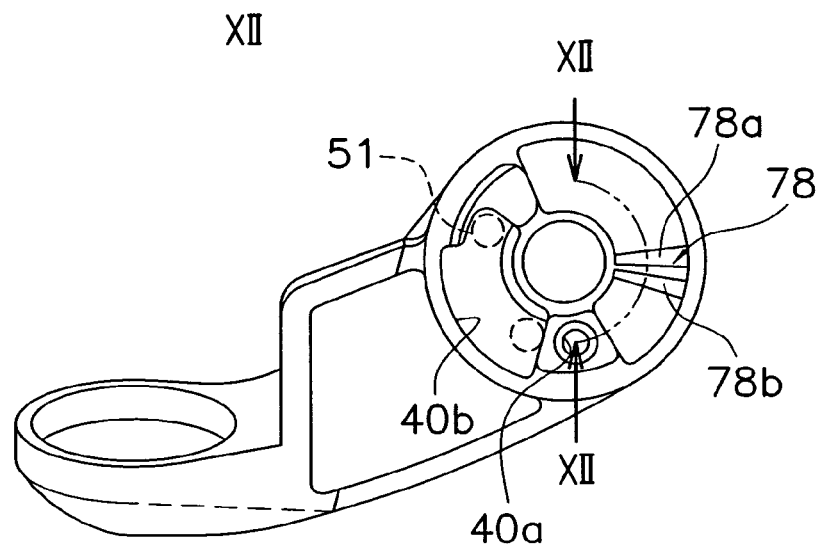
FIG. 11 is a sectional view of a first bail support member of the rotor.

The lid member 2d is made, for example, of an aluminum alloy, and for example, is preferably screwed to the reel body 2a at three locations. As shown in FIGS. 9 and 10, a later-described switching member 52 is detachably/reattachably mounted in the flange portion 2d where the reel body 2a and the lid member 2b split.

As shown in FIGS. 1 and 2, the spool 4 is disposed between a later-described first rotor arm 31 and a later-described second rotor arm 32 of the rotor 3. Further a center portion of the spool 4 is coupled to the front end of the spool shaft 15 via a drag mechanism 71 (see FIG. 2). The drag mechanism 71 is provided inside the spool 4, and serves as a part of a sounding mechanism that emits sound in response to rotation of the spool 4. A fishing-line lock 99 for locking fishing line is attached to the rear of the spool 4.

As shown in FIG. 2, the rotor drive mechanism 5 includes the master gear shaft 10 on which the handle assembly 1 is non-rotatably mounted, a master gear 11 that rotates together with the master gear shaft 10, and a pinion gear 12 that meshes with the master gear 11. Both ends of the master gear shaft 10 are rotatably supported on the reel unit 2 via bearings. Both ends of the master gear shaft 10 are respectively provided with female-threaded portions with different threaded directions and diameters. Thus, the handle shaft 7 of the handle assembly 1 can be mounted non-rotatably to one of these female-threaded portions. Thus, the handle assembly 1 can be mounted to accommodate right-handed and left-handed users.

The pinion gear 12 is formed into a hollow tubular shape. Further, the front portion of the pinion gear 12 extends through the center portion of the rotor 3 and is fixedly coupled to the rotor 3 by a nut 13. The middle and the rear end of the pinion gear 12 in the axial direction are respectively and rotatably supported on the reel body 2a via bearings 14a and 14b.

The oscillating mechanism 6 shifts the spool 4 back and forth relative to the reel unit 2. As shown in FIG. 2, the oscillating mechanism 6 includes a worm 21, a slider 22, and an intermediate gear 23. The worm 21 is arranged substantially below the spool shaft 15 and parallel thereto. The slider 22 moves back and forth along the worm 21, and the intermediate gear 23 is fixedly attached to the front end of the worm 21. The rear end of the spool shaft 15 is non-rotatably and fixedly coupled to the slider 22. The intermediate gear 23 meshes with the pinion gear 12.

As shown in FIG. 2, the rotor 3 includes a rotor unit 16, a bail arm 17, and a bail-tripping mechanism 18. The bail arm 17 is mounted on the fore end of the rotor unit 16 to allow it to pivot between a line-releasing posture and a line-retrieving posture. The bail-tripping mechanism 18 is mounted on the rotor unit 16, and returns the bail arm 17 from the line-releasing posture into the line-retrieving posture.

The rotor unit 16 includes a cylindrical portion 30, a front wall 35, a first rotor arm 31, and a second rotor arm 32. The cylindrical portion 30 is fixedly coupled to the pinion gear 12. The front wall 35 is formed on the inner periphery of the cylindrical portion 30 and is non-rotatably mounted to the pinion gear 12. The first rotor arm 31 and the second rotor arm 32 are disposed opposite to each other on the outer periphery of the cylindrical portion 30 at its rear end. The first rotor arm 31 and the second rotor arm 32 extend frontward such that a space is maintained between each of the first and second rotor arms and the cylindrical portion 30. The cylindrical portion 30, the front wall 35, and the first and second rotor arms 31 and 32 are, for example, made of an aluminum alloy, and are integrally formed with each other by die-cast forming.

Figure 6:
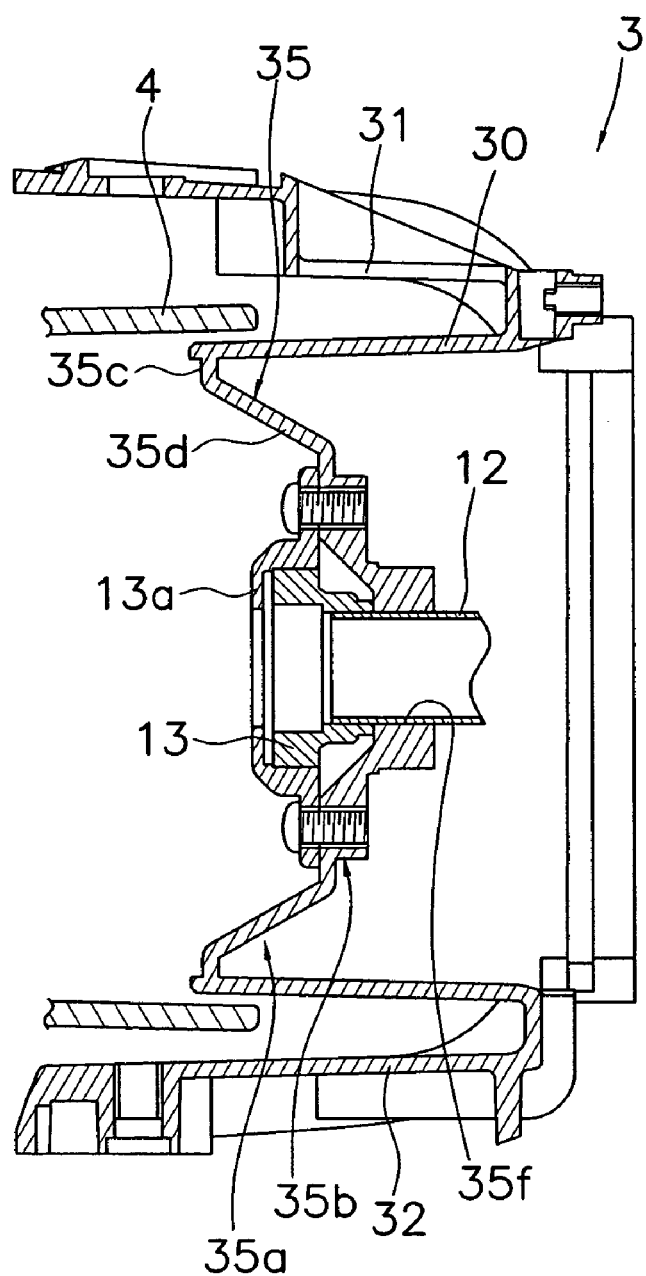
FIG. 6 is an enlarged cross-sectional view of a rotor of the spinning reel.

As shown in FIGS. 2 and 6, the front wall 35 includes a link portion 35a and a disk portion 35b. The link portion 35a is linked to a location of an inner periphery of the cylindrical portion 30 adjacent to the front end of the cylindrical portion 30. An outer portion of the link portion 35a is overlaid by the spool 4 when the spool 4 travels at the foremost position. The disk portion 35b is integrally linked to the link portion 35a and is immovably mounted to the pinion gear 12.

As shown in FIG. 6, the link portion 35a includes an annular portion 35c and a tapered portion 35d. The annular portion 35c is linked to the inner periphery of the cylindrical portion 30 at the front end of the link portion 35a. The tapered portion 35d is linked to the inner periphery of the annular portion 35c and is tapered so that its diameter decreases from its front end toward its rear end. A radial length of the annular portion 35c is shorter than a radial length of the tapered portion 35d. In other words, the radial distance from the outer periphery of the cylindrical portion 30 to the outer peripheral edge of the tapered portion 35d is shorter that the distance from the meeting point of the annular portion 35c and the tapered portion 35d to the radial inner end of the tapered portion 35d. The annular portion 35c is smoothly linked to the inner periphery of the cylindrical portion 30, while the tapered portion 35d is smoothly linked to the disk portion 35b. A joint section between the annular portion 35c and the inner periphery of the cylindrical portion 30 is outer peripherally covered by the spool 4 when the spool 4 is at the foremost position. For example, when the axial length of the cylindrical portion 30 is defined as 100%, the joint section is located in a location less than 20% from the front end of the cylindrical portion 30 (preferably, around 10% from the front end of the cylindrical portion 30).

As shown in FIGS. 2 and 6, a hole portion 35f that is formed in a center part of the disk portion 35b is coupled to the pinion gear 12. The nut 13 is coupled to a fore end of the pinion gear 12. A retainer 13a is attached to the periphery of the nut 13. The nut 13 is a hexagonal nut, for example, and is screwed into the fore end of the pinion gear 12. The retainer 13a is a cap nut immovably attached to the outer periphery of the nut 13, and is fastened to the front wall 35 with screw members. Thus, the disk portion 35b is immovably attached to the pinion gear 12.

Figure 7:
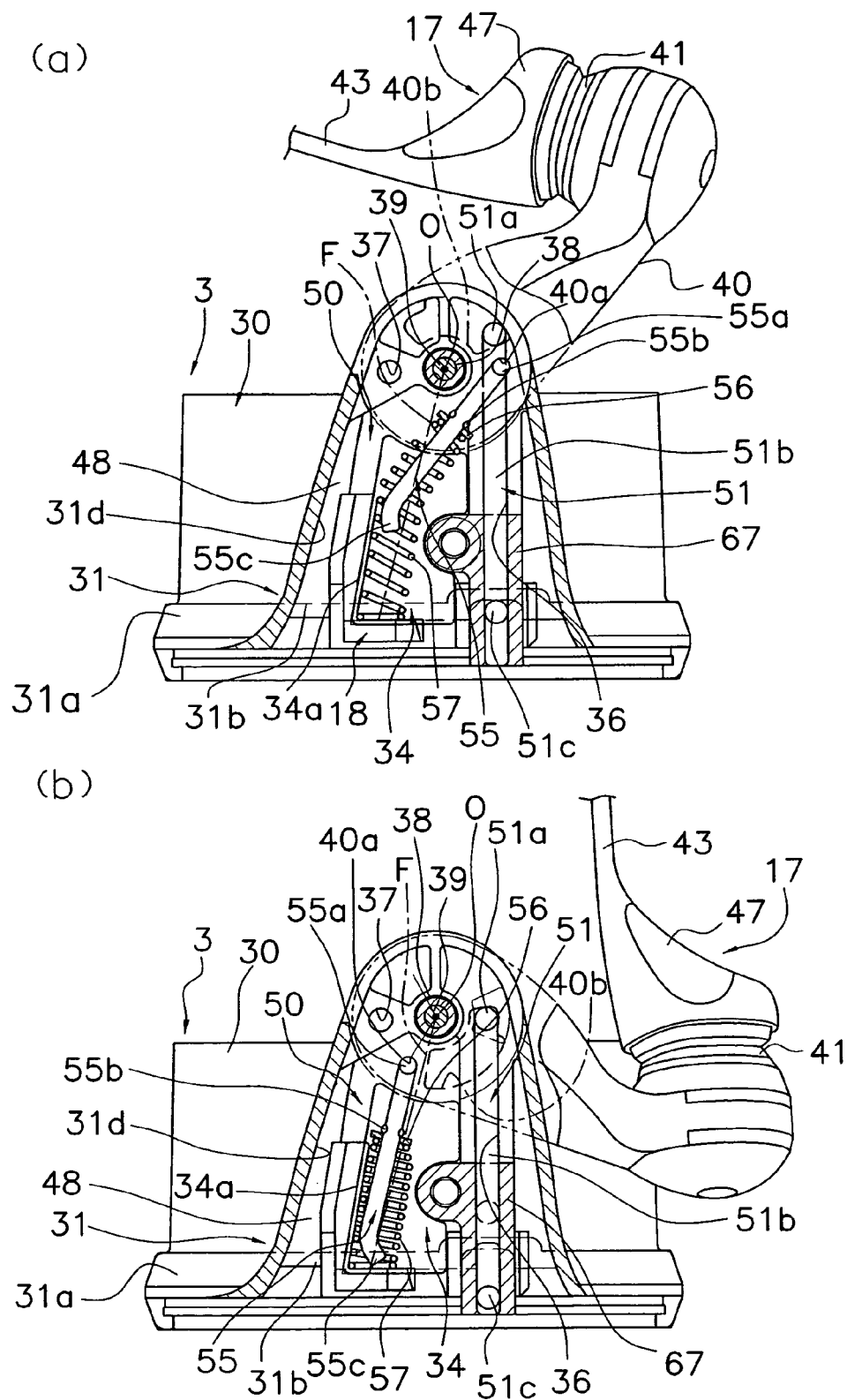
FIG. 7 is a plan view of a first rotor arm of the rotor with sections removed for illustrative purposes.
Figure 8:
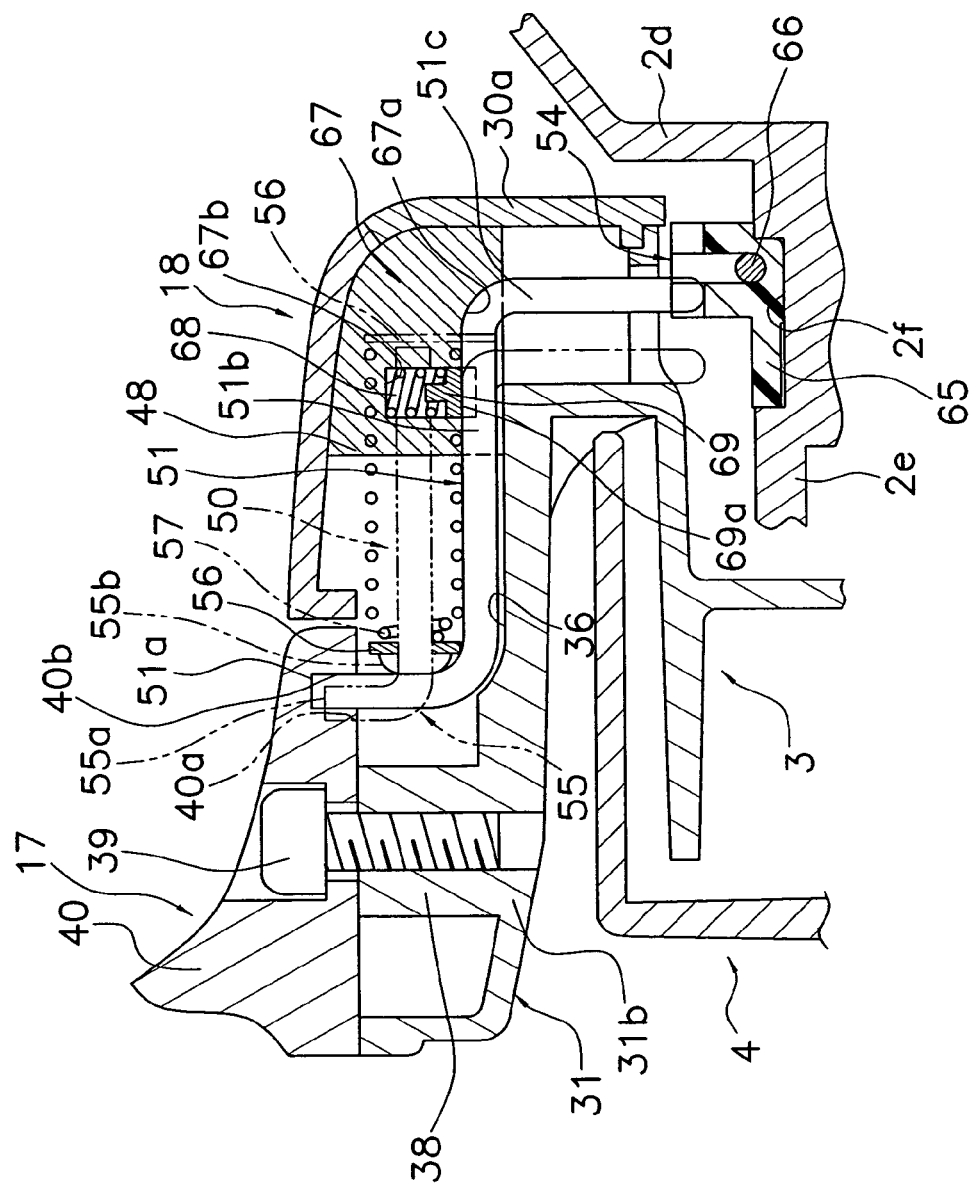
FIG. 8 is an enlarged cross-sectional view of the first rotor arm.

As shown in FIGS. 2, 7 and 8, the first and second rotor arms 31 and 32 respectively include first and second connection portions 31a and 32a, first and second arm portions 31b and 32b, and first and second cover members 31c and 32c. The first and second connection portions 31a and 32a are arranged at a peripheral surface at the rear of the cylindrical portion 30. The first and second arm portions 31b and 32b curve outward and extend forward from the first and second connection portions 31a and 32a. The first and second cover members 31c and 32c cover the outer portions of both of the two connection portions 31a and 32a and the two arm portions 31b and 32b. The first and second connection portions 31a and 32a are formed in smooth circumferential continuation of the cylindrical portion 30.

The first and second arm portions 31b and 32b are formed in smooth continuation with the first and second connection portions 31a and 32a, and extend forward while maintaining a gap from the cylindrical portion 30. The first and second arm portions 31b and 32b form a smooth curve from their tips to the portion where they are connected to the cylindrical portion 30. Apertures 31d and 32d are formed in outer portions of both of the two connection portions 31a and 32a and the two arm portions 31b and 32b, and the first and second cover members 31c and 32c cover the apertures 31d and 32d from outer circumferential side thereof. An accommodation space 48 is formed between the first cover member 31c, the first connection portion 31a, and the first arm portion 31b.

A first bail support member 40 is pivotably mounted to the outer peripheral side of the front end of the first arm portion 31b. As shown in FIG. 7, a relatively long and narrow guide groove 36, a mounting hole 37, and a boss 38 are formed on the first arm portion 31b. The relatively long and narrow guide groove 36 guides a later-described shifting member 51 of the bail tripping mechanism 18. A restriction mechanism 75 (see FIG. 12) to confer resistance to the bail arm 17 is mounted to the mounting hole 37. The boss 38 has a screw hole therein to pivotably mount the first bail support member 40. A second bail support member 42 is pivotably mounted to the inner peripheral side of the front end of the second rotor arm 32b.

The first bail support member 40 is attached to the first rotor arm 31b by a threaded attachment pin 39 that is screwed into the boss 38 of the first arm portion 31b. The attachment pin 39 is composed of a bolt with a hexagonal hole that makes it difficult for fishing line to get caught at its screw head.

As shown in FIG. 7, a line roller 41 to guide fishing line to the spool 4 and a fixed shaft cover 47 that is fixedly coupled to the first bail support member 40 are mounted on the front end of the first bail support member 40 with the line roller 41 being arranged between the first bail support member 40 and the fixed shaft cover 47. The line roller 41 is mounted rotatably to the front end of the first bail support member 40. The fixed shaft cover 47 is shaped like a deformed cone having a sharpened tip. A bail 43 formed by bending a wire into an approximate U-shape is fixedly supported between the front end of the fixed shaft cover 47 and the second bail support member 42. The first and second bail support members 40 and 42, the line roller 41, the bail 43, and the fixed shaft cover 47 constitute the bail arm 17, which guides the fishing line to the spool 4. The bail arm 17 is allowed to pivot between the line-retrieving posture shown in FIG. 7(a) and the line-releasing posture shown in FIG. 7(b), where the bail arm 17 is tripped over from the line-retrieving posture.

The bail-tripping mechanism 18 is disposed within the accommodation space 48 in the first rotor arm 31. The bail tripping mechanism 18 restores the bail arm 17 from the line-releasing posture to the line-winding posture as the rotor 3 is rotated, and maintains the bail arm 17 in these two positions.

As shown in FIGS. 7 to 10, the bail tripping mechanism 18 includes a toggle spring mechanism 50, a shifting member 51, a switching member 52, a rotor braking mechanism 54, and a restriction mechanism 75. The toggle spring mechanism 50 is mounted within the accommodation space 48 and is pivotably mounted to the first arm portion 31b. The shifting member 51 is mounted in the accommodation space 48 such that the shifting member 51 can be freely moved approximately back and forth. The switching member 52 is mounted detachably on a flange portion 2d such that it can contact the shifting member 51. The rotor braking mechanism 54 has a braking member 65 to brake the rotor 3. The restriction mechanism 75 restricts the bail arm 17 from returning to the line-winding position when in the line-releasing position.

As shown in FIG. 7, the toggle spring mechanism 50 is disposed inside the first rotor arm 31, and can assume a first position in which the bail arm 17 is in the line-winding posture, and a second position in which the bail arm 17 is in the line-releasing posture. The toggle spring mechanism 50 holds the bail arm 17 in the line-winding posture or the line-releasing posture. The toggle spring mechanism 50 includes a rod 55 and a coil spring 57. One end of the rod 55 is interlocked with the first bail support member 40 and the other end extends along the first arm portion 31b. The coil spring 57 urges the rod 55 outward.

As shown in FIG. 8, the front end of the rod 55 has an interlocking portion 55a that is bent over towards the first bail support member 40 to interlock with an engagement hole 40a of the first bail support member 40. The rod 55 also includes an interlocking protrusion 55b in its intermediate position to interlock with the front end of the coil spring 57, and a bent portion 55c on its rear end that is bent slightly. A washer 56 against which the front end of the coil spring 57 abuts is mounted to the interlocking protrusion 55b, such that power from the front end of the coil spring 57 is uniformly transmitted to the rod 55.

Referring now to FIGS. 7 and 8, the coil spring 57 contacts and is guided by a guide seat 34. The guide seat 34 is fitted in the first arm portion 31b, and is preferably made of a synthetic polymer such as a synthetic polyamide resin. The guide seat 34 includes a wall portion 34a that is bent so that it guides one side surface of the coil spring 57 and interlocks with the base end thereof. The wall portion 34a has a height that allows it to contact the lateral portion and the base end of the coil spring 57. Thus, the coil spring 57 can be compressed easily, and the arm portion 31b is not damaged when compressing the coil spring 57.

The front end of the coil spring 57 with which the washer 56 interlocks has a smaller coil diameter than the other portions thereof. Thus, at the other portions besides the front end, the coil spring 57 is not easily deformed even when a large gap is created between the coil spring 57 and the rod 55. Further, it is not easy for the rod 55 to change its posture inside the coil spring 57. Note that it is also possible to provide a cover portion that covers a boss portion and an outer peripheral surface of a base portion that contacts the inner peripheral surface of the base portion of the coil spring 57, and interlocks it with the base portion of the coil spring 57. Furthermore, it is also possible to mount the boss portion and the cover portion on the arm portion 31b such that they pivot around an axis that is parallel to the pivot axis of the first bail support member 40. For example, it is possible to form an arc-shaped projection on the base surface of the boss portion and an arc-shaped recess that engages with this arc-shaped projection on the arm portion 31b to make the boss portion pivotable.

This type of toggle spring mechanism 50 is disposed such that the positions at which the rod 55, when engaged with the first bail support member 40 in the line-winding posture and the line-releasing posture, extend in different directions with respect to the lines connecting the coil spring 57 (which is the axis of the pivot shaft), the central position of the base end, and the pivot axis O of the first bail support member 40 (the axis of the attachment pin 39). The position at which these lines intersect is the dead point (the position at which the coil spring 57 is most compressed) of the toggle spring mechanism 50. Thus, the toggle spring mechanism 50 can toggle the bail arm 17 between two postures that interpose the dead point, can bias the bail arm 17 toward both postures, and can maintain the bail arm 17 in both postures. The dead point of the toggle spring mechanism 50 is shifted toward the line-releasing posture.

The shifting member 51 is, for example, a wire preferably made of metal such as stainless steel, and its two ends are bent to 90 degree angles which point in different directions. The shifting member 51 is mounted on the first arm portion 31b such that it can be moved approximately back and forth between a first position (withdrawn position) shown in FIG. 7(a) and a second position (contact position) shown in FIG. 7(b). As shown in FIGS. 7 to 10, a front end portion 51a of the shifting member 51 is bent outward, and interlocked with a fan shaped engagement groove 40b formed on the first bail support member 40. A central portion 51b extends along the first arm portion 31b radially inward of the rod 55.

A rear end portion 51c passes through the guide groove 36, and projects inward to a position where it overlaps slightly with the braking member 65 that forms a part of the rotor braking mechanism 54. The width of the guide groove 36 is approximately the same as the diameter of the shifting member 51. Therefore, the inner side in the radial direction of the central portion 51b of the shifting member 51 is guided back and forth along the guide groove 36 as the bail arm 17 pivots. The outer peripheral side of the bent portion between the intermediate portion 51b and the rear-end portion 51c is guided in the front-to-rear and diametric directions by a guide member 67. Inside the guide member 67, which is fixedly attached to the first cover member 31c, a slot 67a is formed. The slot 67a is curved so as to nestle the rear-end portion 51c, as shown in FIG. 8.

In the guide member 67, a round-columnar attachment hole 67b, into which a compression spring 68 made of a coil spring can fit, is formed opening onto the slot 67a. The push spring 68 is mounted in the guide member 67 in the compressed state, and urges the rear end portion 51c toward the braking member 65 by pressing down on the middle portion 51b of the shifting member 51. A pressing member 69 was a semicircular arcuate recess 69a formed therein to engage the outer peripheral surface of the intermediate portion 51b of the shifting member 51. The pressing member 69 is fitted into the tip of the compression spring 68. The pressing member 69 makes the middle portion 51b of the shifting member 51 move back and forth, and is provided in order to transmit efficiently the urging force of the compression spring 68 to the middle portion 51b.

When the bail arm 17 is in the line-releasing position, the end of the shifting member 51 that is interlocked with the engagement groove 40b is positioned further to the line-winding position than the line connecting the rear end portion 51c with the pivot center of the bail arm 17. That is to say, the shifting member 51 is positioned so that in both the first position (withdrawn position) and the second position (contact position), the location where the shifting member 51 is interlocked with the first bail support member 40 is on the same side of the line connecting the axis of the rear end portion 51c in the contact position (FIG. 7b) with the pivot axis of the first bail support member 40. Thus, when the switching member 52 presses against the rear end portion 51c of the shifting member 51, the first bail support member 40 can be restored to the line-winding position. In this second position (contact position), the end surface of the rear end portion 51c extends downward beyond the front end surface of the braking member 65 and slightly inward from the outer peripheral surface of the braking member 65. Therefore, the same braking power can always be obtained even if the shifting member 51 moves only by an insignificant amount.

The switching member 52 is a component preferably made of a synthetic polymer such as a synthetic polyamide resin or polyacetal for example. As shown in FIGS. 9 and 10, the switching member 52 is mounted detachably/reattachably on the flange 2d where the reel body 2a and the lid member 2b split apart. A rectangular cut-out 53 is formed on the portion where the reel body 2a and the lid member 2b are separated from each other. The switching member 52 includes a cone-shaped cam portion 60 having two oblique surfaces 60a and 60b, a neck portion 61 integrally formed with the cam portion 60, and a brim portion 62. The downstream side in the line-winding direction (shown by the arrow in FIG. 9) of the oblique surface 60a projects forward toward the rotor 3 relative to its upstream side. The amount that the oblique surface 60b extends toward the downstream side in the line-winding direction is less than the amount of extension of the oblique surface 60a toward the upstream side. In other words, the oblique surface 60a is larger and has smaller inclination than the oblique surface 60b. A projecting tip 60c is the highest forward projecting point of the oblique surfaces 60a and 60b. Further, the amount that the projecting tip 60c projects forward is set such that the shifting member 51 exceeds the dead point of the toggle spring mechanism 50 when the rear end portion 51c of the shifting member 51 contacts the oblique surface 60a and pushes the bail arm 17 toward the line-winding position.

The neck portion 61 is sized such that it can be fitted into a cut-out 53. Further, the gap between the cam portion 60 and the brim portion 62 is approximately the same as the wall thickness of the flange portion 2d. The brim portion 62 has a larger cross-sectional area than the neck portion 61, and contacts the rear surface of the flange portion 2d. Since the oblique surface 60b is provided, when the bail arm 17 is in the line-releasing position, even if the rotor 3 is forced to rotate in reverse (rotation in the direction in which the line is reeled out) and the shifting member 51 contacts the switching member 52, the shifting member 51 of the bail tripping mechanism 18 is guided smoothly by the oblique surface 60b of the switching member 52.

The rotor braking mechanism 54 brakes the rotor 3 when the bail arm 17 has pivoted into the line-releasing position. The rotor braking mechanism 54 includes the shifting member 51 and the braking member 65 mounted on the mounting groove 2f formed on the base end of the cylindrical portion 2e. In particular, the shifting member 51 is a component of the bail-tripping mechanism 18, and at the same time is a component of the rotor braking mechanism 54.

The braking member 65 is provided in order to brake the rotation of a rotor 3 when the bail arm 17 is in the line-releasing posture. The braking member 65 is composed of an approximately semi-circular first braking member 65a and second braking member 65b. The braking member 65 is preferably made of an elastic material such as synthetic rubber, such as styrene-butadiene rubber (SBR), acrylonitrile-butadiene rubber, butadiene rubber, isoprene rubber, chloroprene rubber, silicone rubber or urethane rubber. The first braking member 65a and the second braking member 65b are press-fitted onto the circular mounting groove 2f by a spring member 66 mounted on an annular groove 65e formed in the outer periphery thereof. The braking member 65 further includes a drag portion 65c that frictionally engages with the mounting groove 2f and allows rotation, and a plurality of engaging portions 65d that engages with the rear end portion 51c of the shifting member 51. The engaging portions 65d are gaps disposed on the outer periphery of the braking member 65, and function as engaging grooves that engage with the rear end portion 51c. In addition, tapered portions 65f that incline toward the engaging portions 65d are formed in a triangular prism at a plurality of locations on the braking member 65. The tapered portions 65f are oblique surfaces that are formed to guide the rear end portion 51c to the engaging portions 65d.

Figure 14:
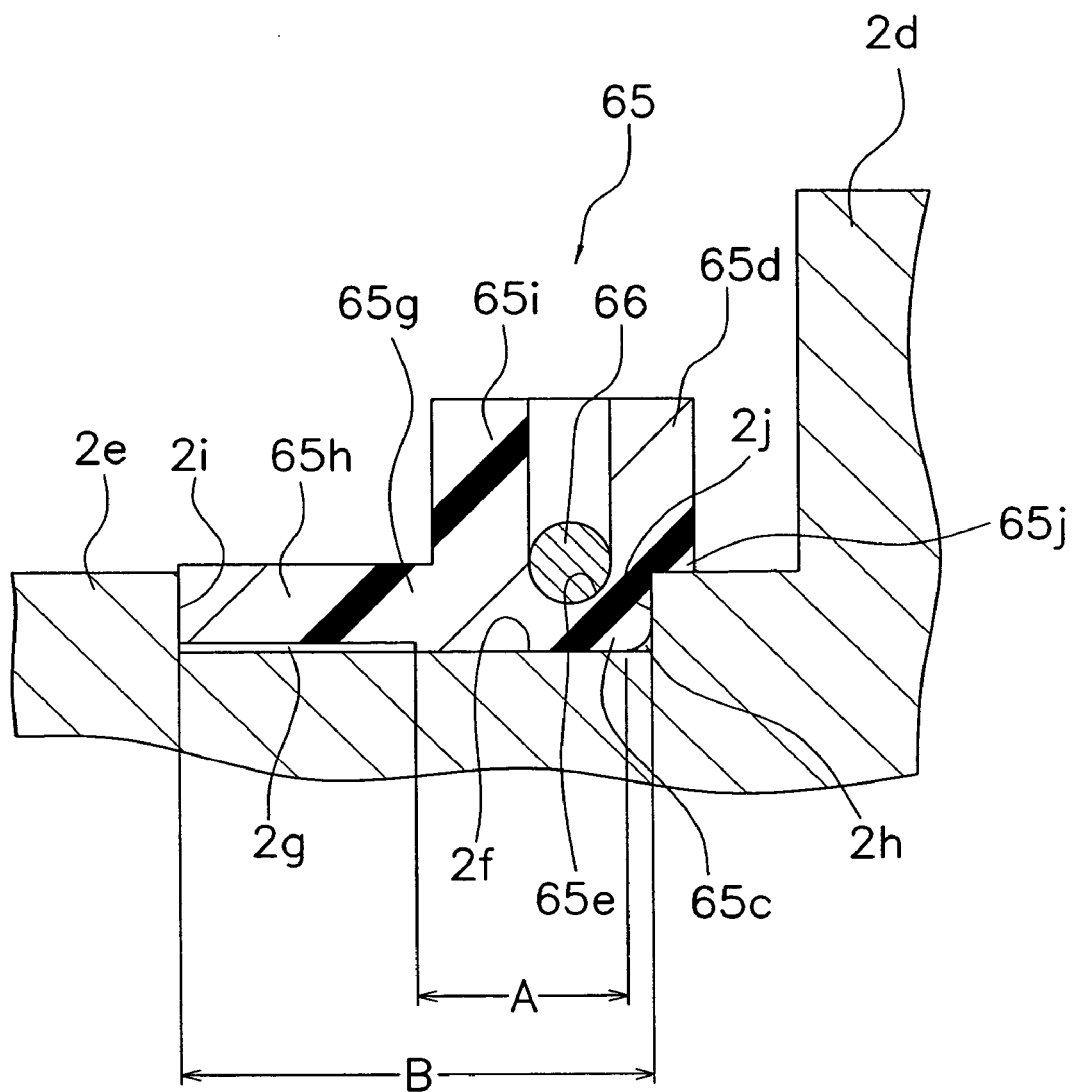
FIG. 14 is an enlarged cross-sectional view of a portion of a fixed shaft of the first rotor arm.

As shown in an enlarged view of FIG. 14, the braking member 65 includes an annular body portion 65g attached to the mounting groove 2f. The drag portion 65c is provided on the inner periphery side of the body portion 65g. The axial length A of the drag portion 65c is shorter than the axial length B of the body portion 65g. Thus, a first gap 2g is provided between a front wall surface 2i of the mounting groove 2f and the front end surface of the drag portion 65c, while a second gap 2h is provided between a rear wall surface 2j of the mounting groove 2f and a rear end surface of the drag portion 65c. The axial length of the first gap 2g is longer than that of the second gap 2h. In addition, the axial length B of the body portion 65g is substantially the same as the axial length of the mounting portion 2f. Thus, the axial length A of the drag portion 65c is shorter than the axial length of the mounting portion 2f.

Furthermore, as shown in FIG. 14, the body portion 65g includes a first annular member 65h that is formed on the front side thereof, and a second annular member 65i that is formed with a larger diameter than the first annular member 65h. The front part of the drag portion 65c is provided on the inner periphery of the first annular member 65h, while the rear part of the drag portion 65c is provided on the inner periphery of the second annular portion 65i. The plurality of engagement portions 65d is formed on the outer periphery side of the second annular portion 65i. The annular groove 65e is formed on a location of the outer periphery side of the second annular portion 65i, which is located outward from the drag portion 65c. Additionally, the second annular portion 65i is provided with a protruding portion 65j protruding rearward from the mounting portion 2f. The protruding portion 65j protrudes toward a rear end of the cylindrical portion 2e, and is arranged so that its end is not in contact with the flange portion 2d.

The spring member 66 is an arc-shaped wire member that is mounted in the groove 65e formed in the outer periphery of the second annular portion 65i of the braking member 65. The spring member 66 has an opening between its ends so as to be attached to the braking member 65. One end of the spring member 66, which is bent in the radial direction of the spring member 66, is held in order to retain the spring member 66 in the annular groove 65e.

Figure 12:
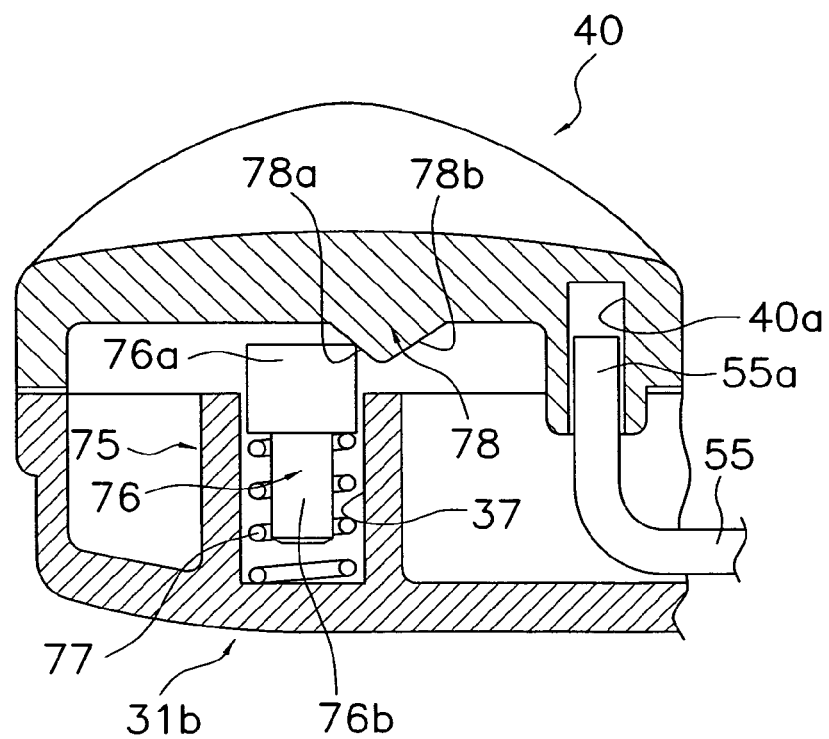
FIG. 12 is a cross-sectional view of the first bail support member taken along a line XII—XII in FIG. 11.
Figure 13:
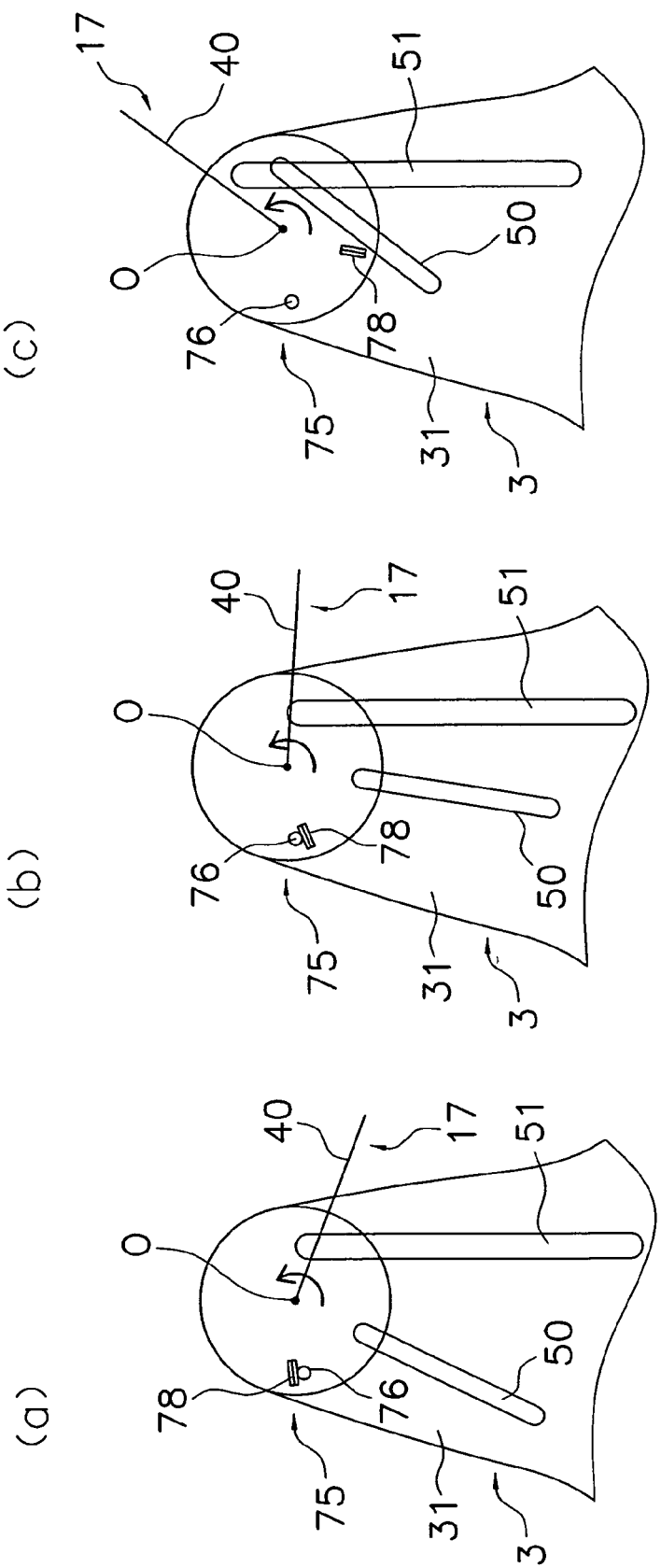
FIG. 13 is a schematic view showing the changes in the restriction state when a bail arm of the spinning reel is pivoted.

As shown in FIGS. 7, 12, and 13, the restriction mechanism 75 is provided between the opposing portions of the bail arm 17 and the first arm portion 31b of the rotor 3. This restriction mechanism 75 restricts the bail arm 17 from returning to the line-winding position when the bail arm 17 is disposed in the line-releasing position, and releases this restriction when the rear end portion 51c of the shifting member 51 reaches the projecting tip 60c of the oblique surface 60a and pivots the bail arm 17 to the line-winding position. The restriction mechanism 75 includes a restriction pin 76 that is mounted in the mounting hole 37 of the first arm portion 31b, a coil spring 77 that urges the restriction pin 76 toward the bail arm 17, and a pushing portion 78 that is provided on the first bail support member 40.

The restriction pin 76 is a metal pin having a large diameter contact portion 76a and a small diameter spring mounting portion 76b. A front end of the coil spring 77 contacts the stepped portion between the contact portion 76a and the spring mounting portion 76b. The coil spring 77 is disposed around the outer periphery of the spring mounting portion 76b, and urges the restriction pin 76 toward the first bail support member 40. The pushing portion 78 has two oblique surfaces 78a and 78b, and is formed to project toward the first arm portion 31b. When the first arm portion 31b is to be pivoted from the line-releasing position to the line-winding position, the pushing portion 78 is disposed in a position in which it can pass over the restriction pin 76 and release the restriction at the point at which the rear end portion 51c of the shifting member 51 reaches the projecting tip 60c of the oblique surface 60a. More specifically, as shown in FIG. 13(a), the pushing portion 78 is positioned upstream from the restriction pin 76 (the pivot direction shown by the arrow) when in the line-releasing position, and as shown in FIG. 13(b), passes over the restriction pin 76 at the point in which the toggle spring mechanism 50 reaches the dead point when pivoting to the line-winding position.

In the bail tripping device 18 configured in this manner, the toggle spring mechanism 50 can be toggled between a first position shown in FIG. 7(a) and a second position shown in FIG. 7(b). The first position corresponds to the line-winding position of the bail arm 17, and the second position corresponds to the line-releasing position of the bail arm 17. Furthermore, the rear end portion 51c of the shifting member 51 is guided by the guide groove 36 and can move back and forth between the first position (withdrawn position) shown in FIG. 7(a) and the second position (contact position) shown in FIG. 7(b). The first position (withdrawn position) corresponds to the line-winding position, whereas the second position (contact position) corresponds to the line-releasing position. In the second position (contact position), the rear end portion 51c of the shifting member 51 engages with an engaging portion 65d of the braking member 65. At this time, in the rotor braking device 54, when the rotor 3 and the braking member 65 rotate, the rotor 3 is braked because the drag portion 65c frictionally engages with the mounting groove 2f.

Further, in the second position (contact position), when through operation of the handle assembly 1 the rotor 3 rotates in the line-retrieving direction, the rear-end portion 51c of the shifting member 51 collides with the inclined surface 60a of the switching portion 52 and is turned. Further, the shifting member 51 is pressed frontward, toward the first position (withdrawn position). Thus, the bail arm 17, at the moment it goes by the dead point of the toggle-spring mechanism 50, is restored into the line-retrieving posture. At this time, the restriction due to the restriction pin 76 of the restriction mechanism 75 is released before exceeding the dead point of the toggle spring mechanism 50.

As shown in FIG. 2, a reverse rotation check mechanism 70 to block and to release the reverse rotation of the rotor 3 is disposed inside the cylindrical portion 30 of the rotor 3. The reverse rotation prevention mechanism 70 includes a roller-type one-way clutch 72, and a stopper shaft 73 to switch the one-way clutch 72 between an operating state and a non-operating state. The reverse rotation check mechanism 70 blocks or releases the reverse rotation of rotor 3 by switching the one-way clutch 72 between an operating state and a non-operating state with the stopper shaft 73. The stopper shaft 73 includes a stopper knob 73a and a shaft portion 73b.

Figure 15:
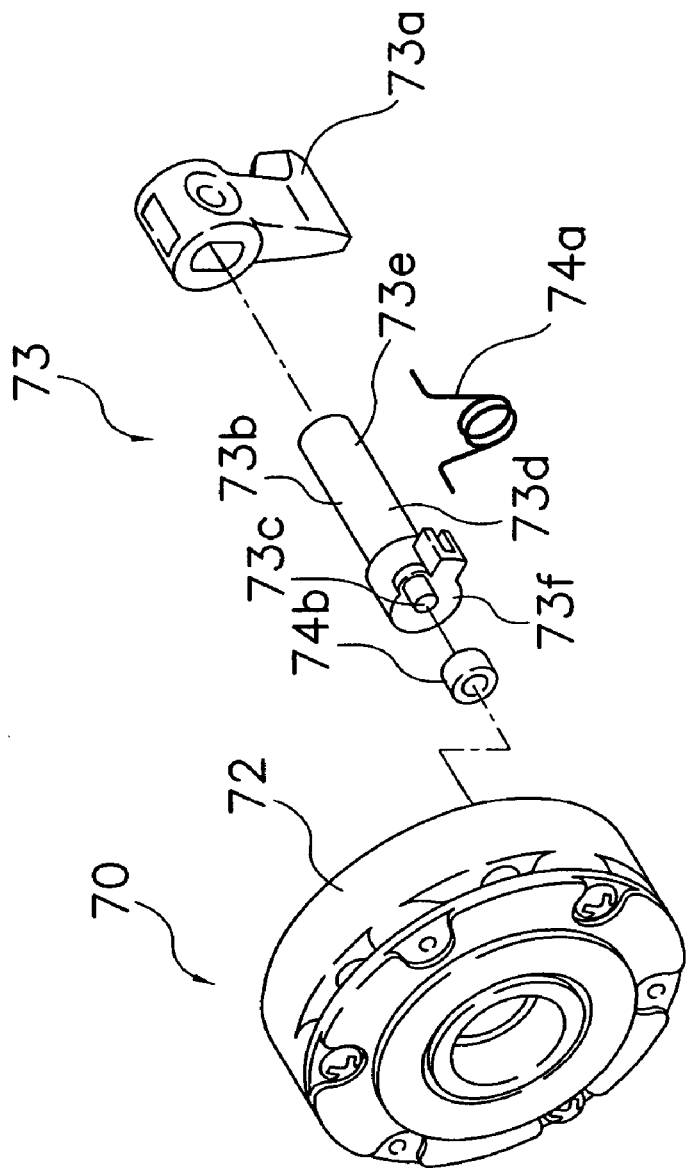
FIG. 15 is an exploded oblique view of a reverse rotation check mechanism of the rotor.

As shown in FIG. 15, the shaft portion 73b portion is a columnar-shaped shaft member made of a metal, and includes a shaft body portion 73d, a small diameter portion 73e, and a large diameter portion 73f. The small diameter portion 73e having a smaller diameter is provided at the rear end of the shaft body portion 73d. A stopper knob 73a is fixedly attached to the small diameter portion 73e. The large diameter portion 73f with a larger diameter is provided at the front end of the shaft body portion 73d. A cam portion 73c is eccentrically disposed on the front surface of the large diameter portion 73f. One end of a toggle spring 74a engages with a side of the large diameter portion 73f. Thus, the shaft 73b is positioned between two postures of an operational posture and a non-operational posture. The shaft 73b is arranged so that the outer periphery of the large diameter portion 73f is in contact with an inner periphery of a braking member 65.

As shown in FIG. 15, the cam portion 73c is eccentrically disposed on and protrudes from the front surface of the large diameter portion 73f. A cylindrical-shaped collar member 74b is attached to the periphery of the cam portion 73c. The collar member 74b engages with a switching portion at the rear of the one-way clutch 72 while being attached to the cam portion 73c. In this case, a pivotal operation of the stopper knob 73a in left and right direction pivots the cam portion 73c, thus, the cam portion 73c switches the one-way clutch 72 engaging with the cam portion 73c between an operational state and a non-operational state.

Figure 16:
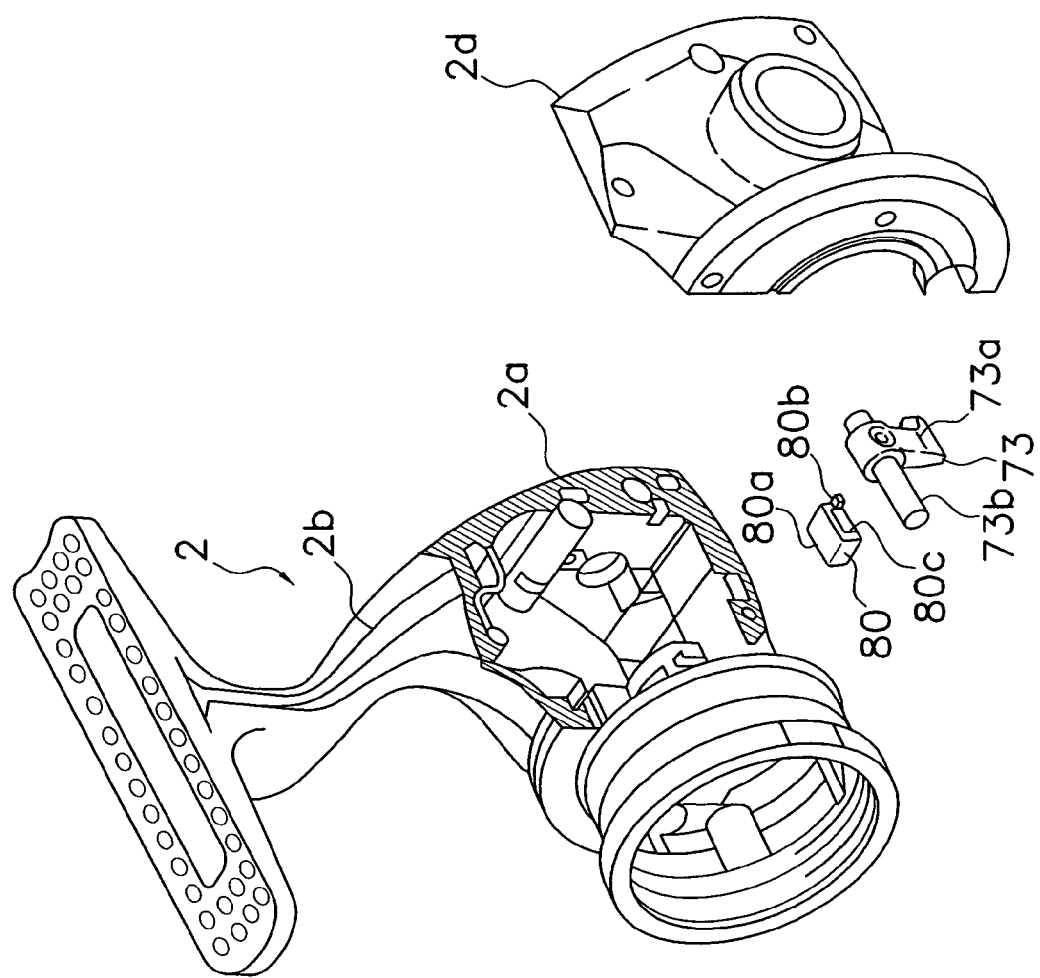
FIG. 16 is an exploded oblique view of a reel unit of the spinning reel.
Figure 18:
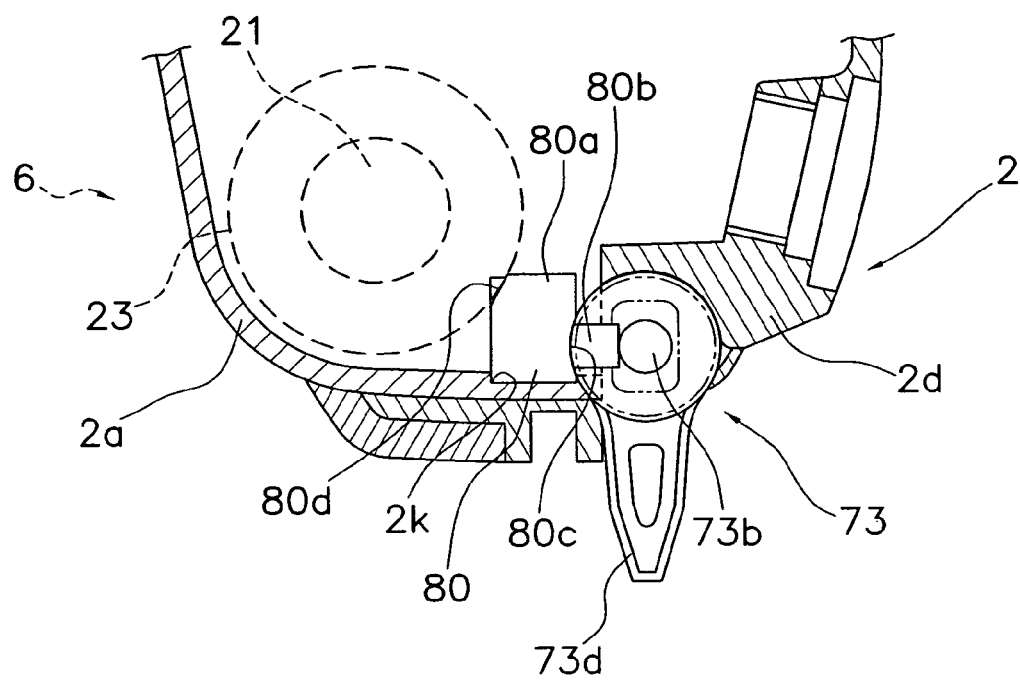
FIG. 18 is an enlarged cross-sectional view of the periphery of the reverse rotation check mechanism of the reel unit.

As shown in FIGS. 16 and 18, the stopper shaft 73 is attached to a lower part of the reel unit 2. The reel unit 2 further includes a cover member 80. The cover member 80 is arranged between the reel body 2a and the lid member 2d, and is detachably attached to the reel body 2a in order to cover the space of the reel body portion 2a adjacent to the stopper shaft 73.

The cover member 80 is attached to an attachment portion 2k in a lower part of the reel body 2a, and closes the space where the worm 21 and the intermediate gear 23 of the oscillating mechanism 6 are accommodated. In this case, since the reel body 2a and the cover member 80 are separately formed, it is not necessary to use a slide core, which is conventionally used to form a portion corresponding to the cover member 80 of the reel body 2a by a die. Accordingly, a process for producing the reel body 2a can be simple.

Figure 17:
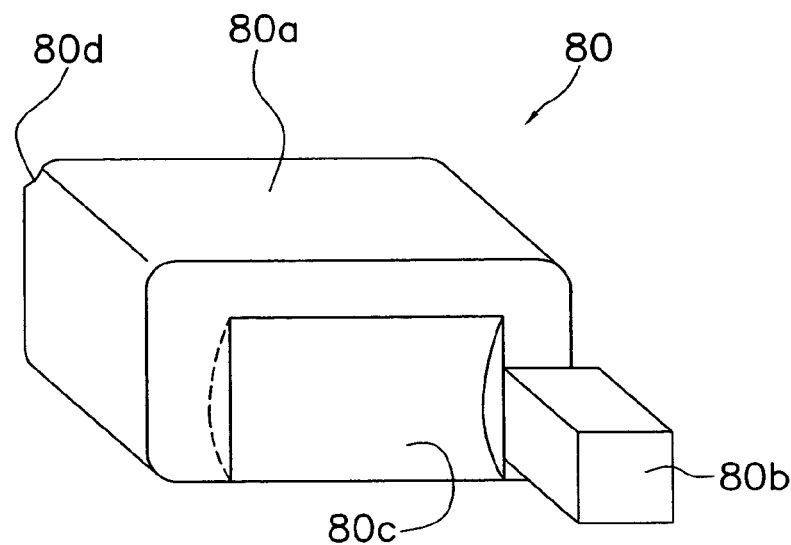
FIG. 17 is an oblique view of a casing member of the reel unit.

As shown in FIGS. 16 to 18, the cover member 80 includes a box-shaped body portion 80a, a protruding portion 80b, a recessed portion 80c, and a cut-out 80d. The protruding portion 80b protrudes at the rear of the body portion 80a toward the lid member 2d. The recessed portion 80c is formed in a recessed shape in a part of the side of the body portion 80a on the lid member 2d side. The cut-out 80d is formed in a cut-out shape that is cut out from the top corner part of the body member 80a on the reel body 2a side. As shown in FIG. 18, the protruding portion 80b serves to thrust the shaft portion 73b of the stopper shaft 73 toward the lid member 2d side. Thus, the shaft portion 73b is reliably supported by the lid member 2d. As shown in FIGS. 17 and 18, the recessed portion 80c is a generally semi-columnar-shaped groove. A part of the stopper knob 73a of the stopper 73 is attached thereto. The cut-out 80d is formed so as to avoid the intermediate gear 23 of the oscillating mechanism 6.

To install the cover member 80 thus structured, the rotor driving mechanism 5 and the oscillating mechanism 6 are initially installed into the interior space of the reel body 2a, and then the cover member 80 is attached to the attachment portion 2k of the reel body 2a. Subsequently, the stopper shaft 73 is attached, and then the lid member 2d is fastened to the reel body 2a. In this case, since the cover member 80 engages with the attachment portion 2k of the reel body 2a, movement of the cover member 80 is restricted in the axial and lateral directions. Additionally, the movement of the cover member 80 is restricted in the detachment/attachment direction by the stopper shaft 73.

Referring to FIGS. 1, 2, and 6, with the rotor 3 of a spinning reel, the joint section between the annular portion 35c of the link portion 35a and the cylindrical portion 30 is formed at the inner periphery of the cylindrical portion 30 near the front end of the cylindrical portion 30. Additionally, the outer periphery of the joint section is overlaid and covered by the spool 4 when the spool 4 travels to the foremost position. Accordingly, even if a sink mark appears in the outer periphery of the cylindrical portion 30 where the link portion 35a is linked, such mark is not externally exposed. Therefore, a pleasing external appearance can be maintained.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) In the aforementioned embodiment, a front drag type spinning reel is used as an example, but the present invention can also be applied to any type of spinning reel, such as rear drag type spinning reels, spinning reels that do not have a drag, lever drag spinning reels, and the like.

(b) In the aforementioned embodiment, the rotor 3 is made of an aluminum alloy, however, the rotor may be made of another metal material. Furthermore, the rotor 3 of the foregoing embodiment is formed by aluminum die casting. However, the rotor may be formed by injection-molding a synthetic resin.

Figure 19:
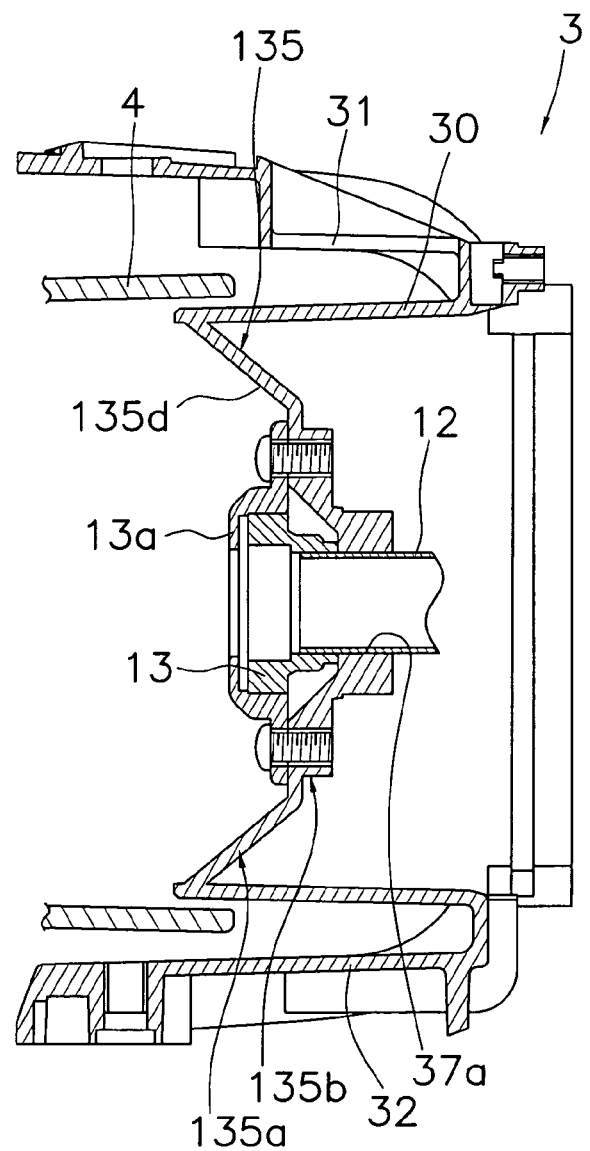
FIG. 19 is a view of a rotor of a spinning reel in accordance with a second preferred embodiment of the present invention corresponding to FIG. 6.
Figure 20:
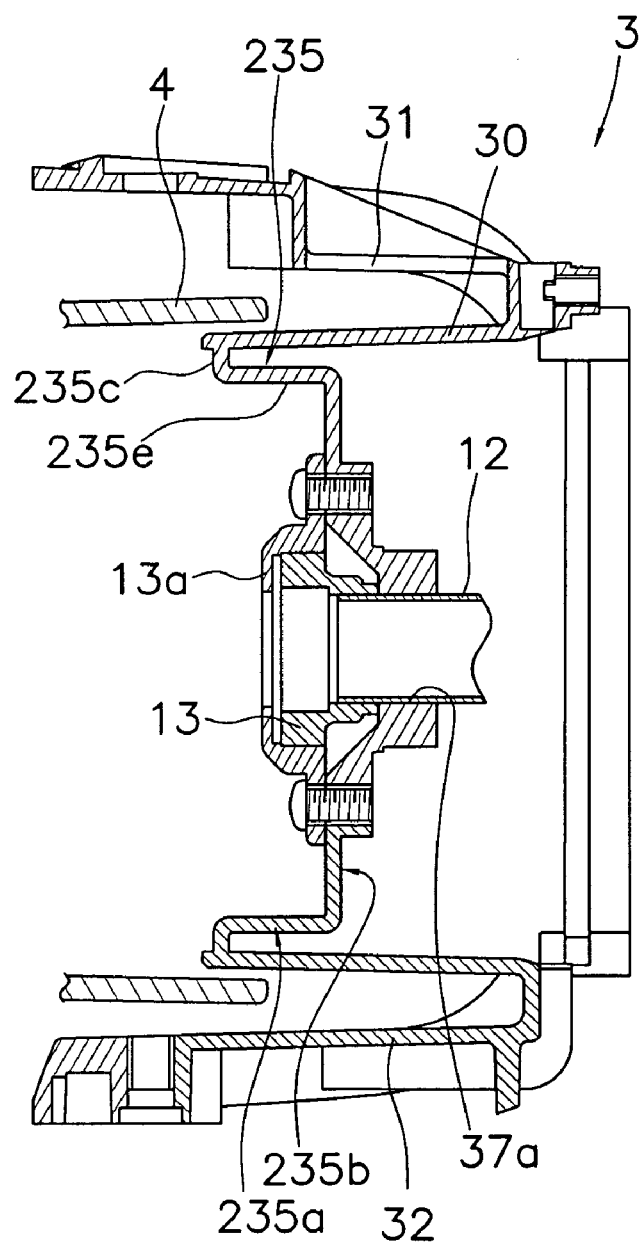
FIG. 20 is a view of a rotor of a spinning reel in accordance with a third preferred embodiment of the present invention corresponding to FIG. 6.

(c) In the aforementioned embodiment, the link portion 35a includes the annular portion 35c and the tapered portion 35d. However, as shown in FIG. 19, the link portion 135a may include only a tapered portion 135d. Furthermore, as shown in FIG. 20, a link portion 235a may include an annular portion 235c, and a tubular portion 235e extending from the annular portion 235c toward a disk portion 235b so that its diameter is same as the disk portion 235b.

Figure 21:
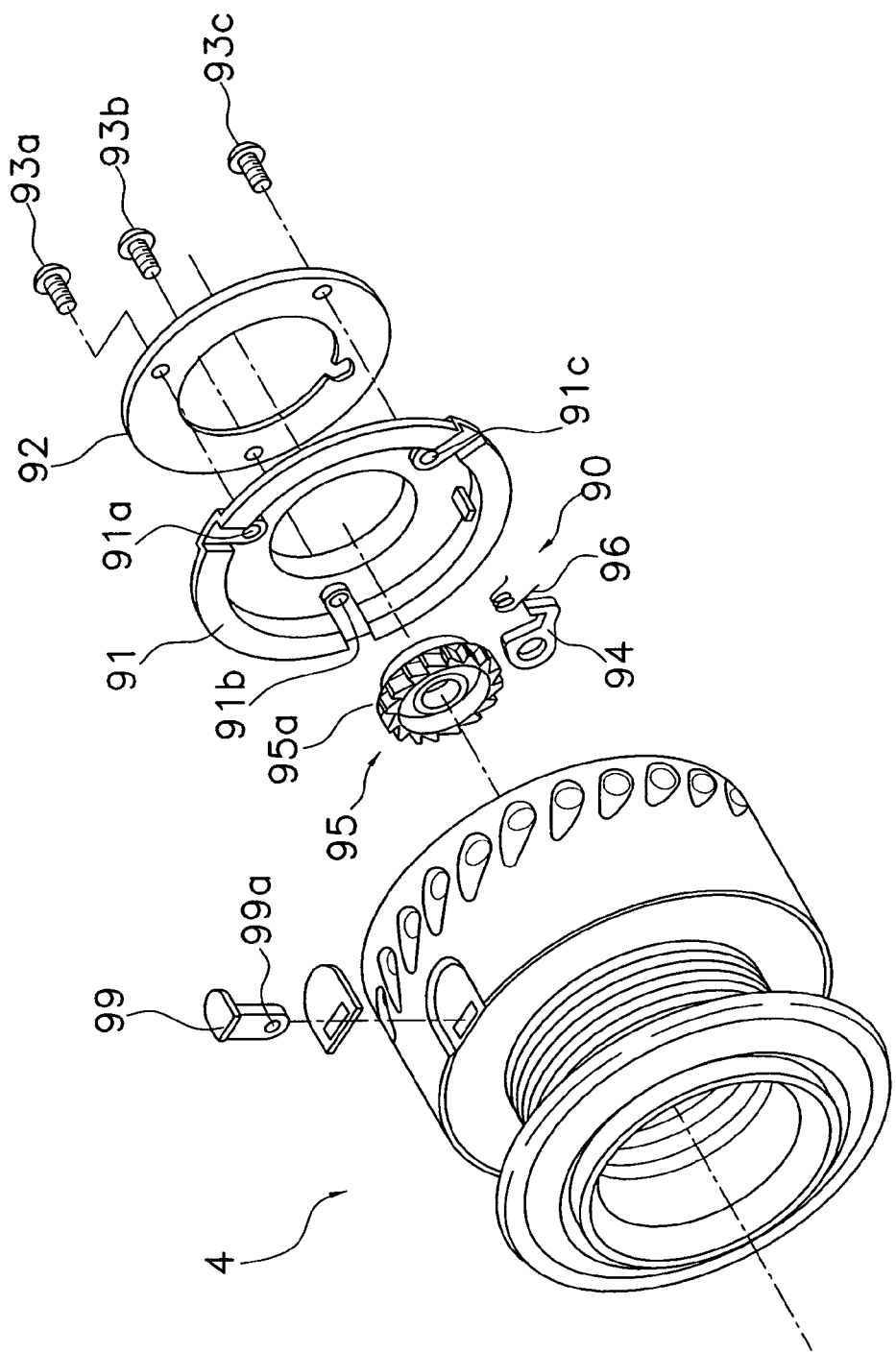
FIG. 21 is an exploded oblique view of a sounding mechanism of a spool of a spinning reel in accordance with a fourth preferred embodiment of the present invention.

(d) In the aforementioned embodiment, the sounding mechanism is provided inside the spool 4, however, as shown in FIG. 21, a sounding mechanism 90 may be provided on the rear of the spool 4.

The sounding mechanism 90 includes an annular attachment member 91, an annular member 92, a first sounding member 94, a second sounding member 95, and a spring member 96. The annular member 92 fastens the attachment member 91 from the rear side to the spool 4 via screw members 93a, 93b, and 93c. The first sounding member 94 is pivotably attached to the attachment member 91. The second sounding member 95 is fixedly coupled to a spool shaft (not shown), and is provided with a plurality of protrusions and recesses 95a on its outer periphery. The spring member 96 biases the first sounding member 94 toward the second sounding member 95. In this case, when the spool 4 rotates, the first sounding member 94 repeatedly strikes the protrusions and recesses 95a of the second sounding member 95, whereby sound is issued.

On the attachment member 91 according to this type of sounding mechanism 90, attachment holes 91a, 91b, and 91c are formed thereon. The attachment holes 91a, 91b, and 91c communicate to an attachment hole 99a formed on a base end of the fishing-line lock 99, and attaches the fishing-line lock 99 to the spool 4 with one of the screw members 93a, 93b, and 93c. In the embodiment shown in FIG. 21, the screw member 93a is attached in the mounting hole 91a and the attachment hole 99a. Thus, the fishing-line lock 99 is fastened to the spool 4. Furthermore, the mounting holes 91a, 91b, and 91c are positioned at positions whose radial distances are different from each other. Therefore, the attachment hole 99a can be easily fastened to spools 4 with different diameters by selecting the mounting holes 91a, 91b, and 91c corresponding to the spools 4 with different diameters.

Figure 22:
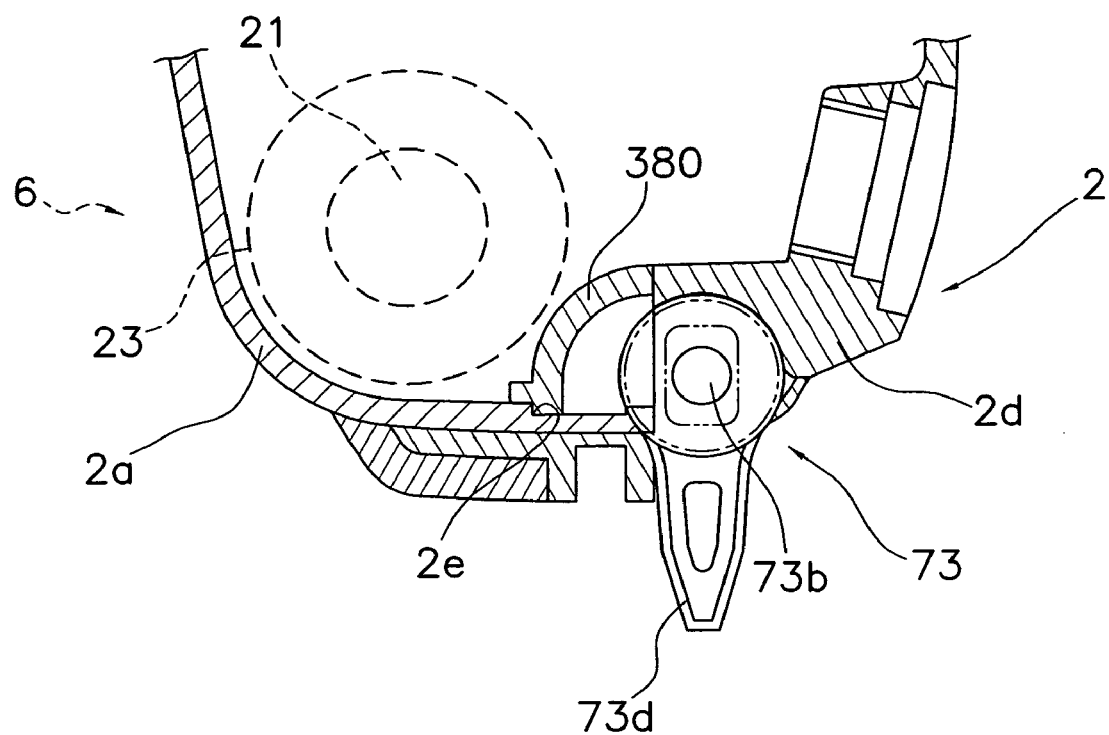
FIG. 22 is a view of a reverse rotation check mechanism of a spinning reel in accordance with a fifth preferred embodiment of the present invention corresponding to FIG. 18.

(e) In the aforementioned embodiment, the cover member 80 has a box shape, however, the cover member 80 is not limited to this shape. The cover member 380 may have a plate shape as shown in FIG. 22. Furthermore, the cover member 80 may be formed unitarily with a switching member 52 of a bail tripping mechanism 18 to restore the bail arm 17 from the line-release position to the line-winding position when the rotor 3 is rotated. In this case, it is possible to reduce the total number of parts and to control increases in manufacturing costs.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-425018 and 2003-319321. The entire disclosures of Japanese Patent Application Nos. 2003-425018 and 2003-319321 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rotor of a spinning reel that is immovably mounted to a pinion gear for guiding and winding fishing line around a spool that is to be oscillated frontward and rearward in its axial direction, comprising:
   a cylindrical portion adapted to be immovably mounted to the pinion gear;
   a front wall including a link portion that is disposed radially inward of the cylindrical portion and whose front end is linked to an inner periphery of the cylindrical portion at substantially a front end of the cylindrical portion, and a disk portion that is integrally linked to the link portion at an axial rear side of the link portion and is adapted to be immovably mounted to the pinion gear; and a pair of first and second rotor arms formed at locations opposite each other on an outer periphery of the cylindrical portion at its rear end, the first and second rotor arms extending frontward such that a space is maintained between each of the first and second rotor arms and the cylindrical portion, the cylindrical portion, the front wall, and the pair of first and second rotor arms being formed by molding, the link portion including an annular portion that is linked to the inner periphery of the cylindrical portion at a front end of the annular portion, and a tapered portion that is linked to an inner periphery of the annular portion and is tapered so that its diameter rearwardly decreases.

2. The rotor of a spinning reel set forth in claim 1, wherein the cylindrical portion, the front wall, and the first and second rotor arms are unitarily formed as a one-piece member.

3. The rotor of a spinning reel set forth in claim 1 wherein the cylindrical portion, the front wall, and the first and second rotor arms are formed of a metal by die-casting.

4. The rotor of a spinning reel set forth in claim 1, wherein the cylindrical portion, the front wall, and the first and second rotor arms are formed of a synthetic resin by injection molding.

5. The rotor of a spinning reel set forth in claim 1, wherein the tapered portion is linked to the inner periphery of the cylindrical portion.

6. A rotor of a spinning reel that is immovably mounted to a pinion gear for guiding and winding fishing line around a spool that is to be oscillated frontward and rearward in its axial direction, comprising:

a cylindrical portion adapted to be immovably mounted to the pinion gear;

a front wall including a link portion that is disposed radially inward of the cylindrical portion and whose front end is linked to an inner periphery of the cylindrical portion at substantially a front end of the cylindrical portion, and a disk portion that is integrally linked to the link portion at an axial rear side of the link portion and is adapted to be immovably mounted to the pinion gear; and a pair of first and second rotor arms formed at locations opposite each other on an outer periphery of the cylindrical portion at its rear end, the first and second rotor arms extending frontward such that a space is maintained between each of the first and second rotor arms and the cylindrical portion, the cylindrical portion, the front wall, and the pair of first and second rotor arms being formed by molding, the link portion including an annular portion that is linked to the inner periphery of the cylindrical portion at a front end of the annular portion, and a tubular portion that is linked to an inner periphery of the annular portion and extends rearwardly so that its diameter is same as a diameter of the disk portion.

7. A spinning reel, comprising:
a handle;
a reel unit that rotatably supports the handle;
a rotor rotatably mounted at a front of the reel unit, the rotor including
a cylindrical portion having a front and rear end, the rear end being mounted to rotor arms of the rotor,
a front wall including a link portion that extends radially inwardly from the cylindrical portion, the link portion having a front end linked to an inner periphery of the cylindrical portion at substantially the front end of the cylindrical portion and a disk portion that is integrally linked to the link portion at an axial rear side of the link portion and is immovably mounted to the pinion gear, and
a pair of first and second rotor arms formed at locations opposite each other on an outer periphery of the cylindrical portion at its rear end, the first and second rotor arms extending frontward such that a space is maintained between each of the first and second rotor arms and the cylindrical portion,
the cylindrical portion, the front wall, and the pair of first and second rotor arms being formed by molding; and
a spool disposed at a front of the rotor so as to be movable forward and backward relative to the reel unit, the rotor being for guiding and winding fishing line around the spool, the link portion being linked to the inner periphery of the cylindrical portion at a position frontward of a rear end of the spool when the spool is at a frontwardmost position.

8. The spinning reel set forth in claim 7, wherein the link portion includes a tapered portion that is tapered so that its diameter rearwardly decreases.

9. The spinning reel set forth in claim 7, wherein the link portion includes an annular portion that is linked to the inner periphery of the cylindrical portion at a front end of the annular portion, and a tapered portion that is linked to an inner periphery of the annular portion and is tapered so that its diameter rearwardly decreases.

10. The spinning reel set forth in claim 7, wherein the link portion includes an annular portion that is linked to the inner periphery of the cylindrical portion at a front end of the annular portion, and a tubular portion that is linked to an inner periphery of the annular portion and extends rearwardly so that its diameter is same as a diameter of the disk portion.

11. The spinning reel set forth in claim 7, wherein the cylindrical portion, the front wall, and the first and second rotor arms are unitarily formed as a one-piece member.

12. The spinning reel set forth in claim 11, wherein the cylindrical portion, the front wall, and the first and second rotor arms are formed of a metal by die-casting.

13. The spinning reel set forth in claim 11, wherein the cylindrical portion, the front wall, and the first and second rotor arms are formed of a synthetic resin by injection molding.

14. The spinning reel set forth in claim 8, wherein the tapered portion is linked to the inner periphery of the cylindrical portion.

* * * * *